United States Patent [19]
Gleasman et al.

[11] Patent Number: 5,878,492
[45] Date of Patent: Mar. 9, 1999

[54] METHODS FOR SHAPING THE TEETH OF SPHERICAL GEARS

[75] Inventors: Vernon E. Gleasman, Pittsford; Keith E. Gleasman, Fairport, both of N.Y.

[73] Assignee: Torvec, Inc., Pittsford, N.Y.

[21] Appl. No.: 810,650

[22] Filed: Mar. 3, 1997

Related U.S. Application Data

[62] Division of Ser. No. 252,743, Jun. 2, 1994, Pat. No. 5,647,802.

[51] Int. Cl.$^6$ .............................. B23P 13/00; F16D 3/18
[52] U.S. Cl. ............................................................. 29/893.3
[58] Field of Search .......................... 29/893.3; 464/159

[56] References Cited

U.S. PATENT DOCUMENTS

| | | | |
|---|---|---|---|
| 1,770,743 | 7/1930 | Morgan | 464/154 |
| 1,841,418 | 1/1932 | Scott | 464/158 X |
| 2,430,683 | 11/1947 | O'Malley | 464/154 |
| 2,496,702 | 2/1950 | Dykman et al. | 464/154 |
| 2,513,758 | 7/1950 | Talbot . | |
| 2,737,900 | 3/1956 | Smith . | |
| 2,893,222 | 7/1959 | Albedyhl et al. | 464/156 |
| 2,924,954 | 2/1960 | Panhard | 464/154 X |
| 3,142,972 | 8/1964 | Spaulding | 464/159 |
| 3,359,757 | 12/1967 | Adams | 464/159 |
| 4,003,218 | 1/1977 | Filderman | 464/158 X |
| 4,018,062 | 4/1977 | Bulliot | 464/158 |
| 4,281,942 | 8/1981 | Gaeckle et al. | 403/359 X |
| 4,305,596 | 12/1981 | Unterstrasser | 464/158 X |
| 4,624,175 | 11/1986 | Wahlmark . | |
| 4,639,200 | 1/1987 | Baumgardner et al. | 464/159 X |

FOREIGN PATENT DOCUMENTS

| | | | |
|---|---|---|---|
| 1172488 | 6/1964 | Germany | 464/159 |

*Primary Examiner*—P. W. Echols
*Attorney, Agent, or Firm*—Eugene Stephens & Associates

[57] ABSTRACT

The disclosed gear system provides distinctive forms of gearing for directly transmitting substantially constant velocity between two shafts, while allowing the angle between the shafts to vary (e.g., by even more than 80°) in any plane during operation. Several forms of gear teeth appropriate for the system are specifically detailed and applied in the design of constant-velocity joints.

18 Claims, 18 Drawing Sheets

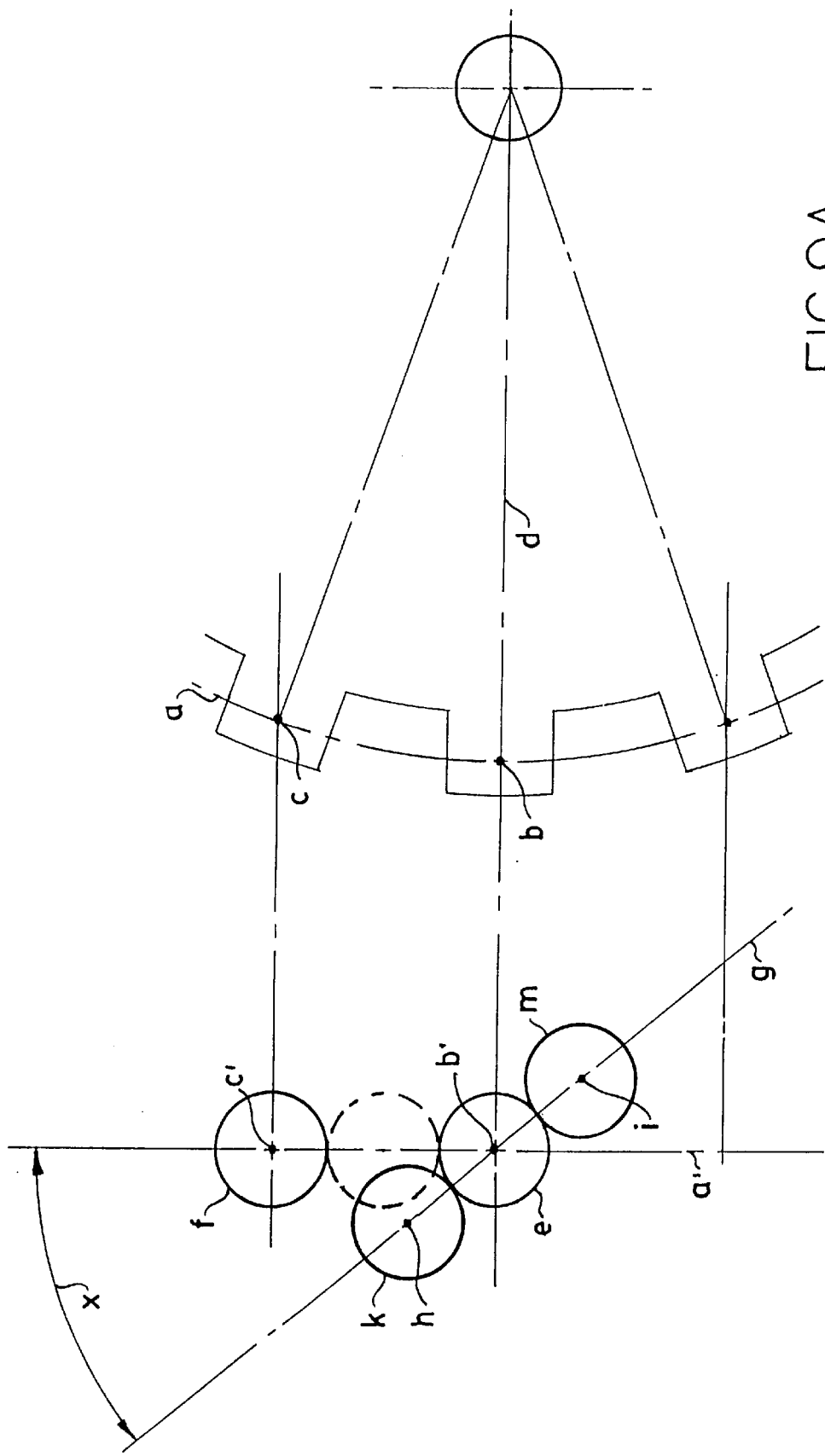

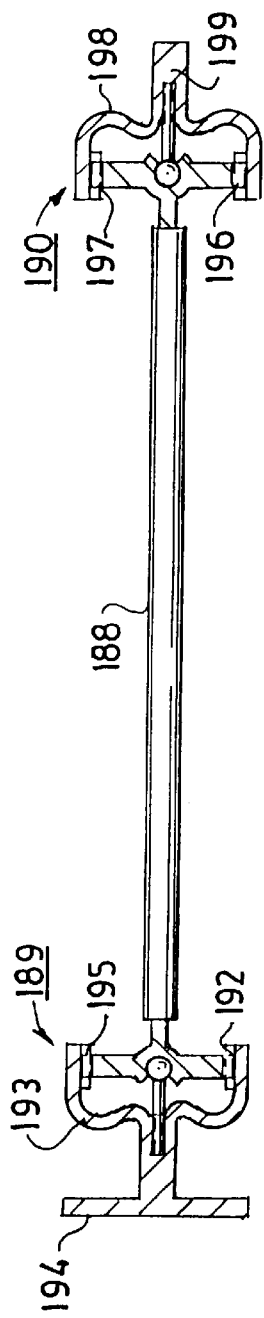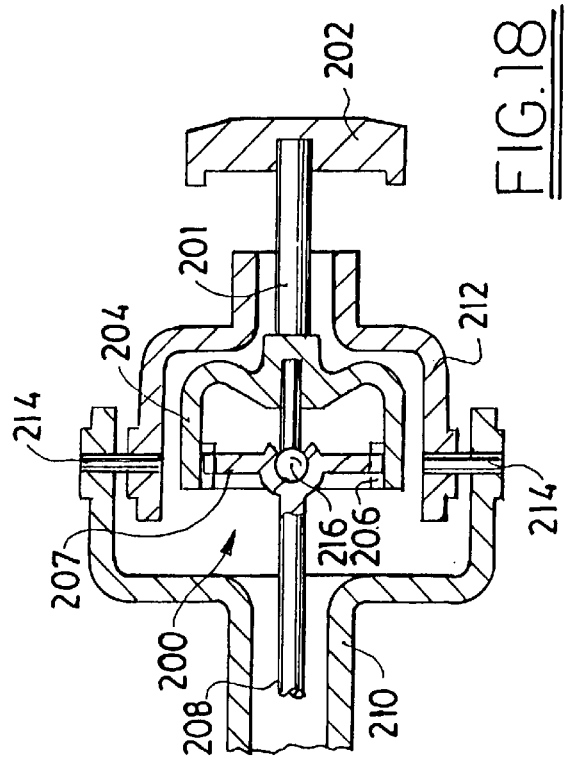

METHODS FOR SHAPING THE TEETH OF SPHERICAL GEARS

RELATED APPLICATIONS

This application is a Division of allowed parent application Ser. No. 08/252,743, filed 2 Jun. 1994, originally entitled VARIABLE-ANGLE GEAR SYSTEM now U.S. Pat. No. 5,647,802.

TECHNICAL FIELD

The invention relates to the design of gear teeth for gears that can be used for directly connecting two shafts in a manner that transmits rotation from the driving shaft to the driven shaft while, at the same time, permitting the angle of intersection between the axes of the shafts to be varied away from 180°-alignment over a relatively wide and continuous range of angles (e.g., ±40°).

BACKGROUND OF INVENTION

For centuries, external and internal cog wheels and spur gears have been used to interconnect shafts on aligned and parallel axes, while bevel gears have been used to transmit rotational forces between shafts having axes that intersect with each other at fixed angles extending over the full range from 90° to 180°. During this century, hypoid gears have been developed to accomplish the same purpose with shafts that not only intersect with each other over the full range of wide angles but whose axes are offset (i.e., non-intersecting). For such known internal and external spur gearing, shaft alignment is an absolute necessity; and known bevel and hypoid gear pairs are designed specifically for only one predetermined angle between the axes of the gears.

There are, however, some known special coupling and joint arrangements for compensating for small shaft misalignments where forces are being transmitted between aligned axes that must experience small angular changes during operation. For instance, it is known to use double-crowned spur gears in nylon sleeves for coupling shafts that may experience slight relative movements in parallel offset (e.g., 0.040"/1 mm) or slight angular misalignment (e.g., <1°). However, for each significant degree of angular change (e.g., >1°) between the axes, a completely new set of mating gears must be designed and manufactured to assure proper coupling and transmission of the rotational forces.

Of course, there are known non-gear means for transmitting rotary motion between shafts experiencing angular change. Perhaps the best known of such devices are the universal joints used to connect the drive shafts and wheel axles of automotive vehicles. Such universal joints are often constructed in the form of two small intersecting axles, each held by a respective yoke. However, the shafts connected by such yoke and axle joints do not turn at the same rate of rotation throughout each entire revolution. Therefore, constant-velocity ("CV") joints have been developed (e.g., Rzeppa and Birfield) in which the points of connection between the angled shafts are provided by rolling balls which, during each revolution of the driving and driven shafts, roll back and forth in individual tracks to maintain their respective centers at all times in a plane which bisects the instantaneous angle formed between the shafts.

Such universal and CV joints are quite complex and relatively difficult to lubricate, and the design and manufacture of such joint components is widely recognized as a very specialized and esoteric art of critical importance to the worldwide automotive industry. While this CV joint art is very well developed, the joints are expensive, comprising many parts that are difficult to manufacture; and such joints are limited in regard to the rotational speeds that they can transmit and in regard to the angles over which they can operate. Further, the rotational speeds that can be achieved by such joints are limited by the inertia of the rolling balls whose motion must reverse during each revolution.

Our invention has broad potential utility in any technology in which motion is transmitted between axes that intersect at variable angles during operation; and, as shown in specific embodiments disclosed below, our invention has particular applicability to, and provides remarkable improvements in, the CV joint art, providing the basis for remarkably simplifying and improving the design of CV joints.

SUMMARY OF THE INVENTION

In its broadest sense, our invention is a gear system with novel forms of gearing for directly connecting two shafts in a manner that transmits rotation from the driving shaft to the driven shaft while, at the same time, permitting the angle of intersection between the axes of the shafts ("shaft angle") to be varied. Such angular variation is possible over a wide and continuous range extending to each side of 180° (i.e., extending to each side of the position where the axes are either in parallel alignment or are coincident) to some preferred maximum angle differing from 180° by more than 2° (e.g., 40°). As used herein, the term "preferred maximum angle" indicates any angle (differing from 180° in either direction) up to which the shafts must be able to intersect for the satisfactory transmission of rotational forces in the particular application in which the gear system is being used. For instance, if the preferred maximum angle were 40°, possible articulation would be up to 40° on each side of the 180° alignment position; and this would allow the shafts, while they were transmitting rotational forces, to be angularly adjusted relative to each other over a full range of 80°.

Basically, the invention uses a single pair of gears to transmit constant velocity between two shafts, while allowing the angle between the shafts to vary during operation. In the most preferred embodiment, the shaft axes can be articulated relative to each other about a common pivot point in any plane; and this is accomplished by a design in which the pitch circles of the two gears are of identical size and always remain, in effect, as great circles on the same pitch sphere. As is axiomatic in spherical geometry, such great circles intersect at two points, and the pair of lunes formed on the surface of the sphere between the intersecting great circles (i.e., between the pitch circles of the gears) inscribe a giant lemniscate ("figure-eight") around the surface of the sphere. We believe that, since the relative movement of the tooth contact points shared between the mating gears inscribe respective lemniscates at all relative angular adjustments of the gear shafts, the two shafts rotate at constant velocity.

As has just been indicated, in the explanation below relating to the design and manufacture of our gears, the pitch circles of each gear can be considered theoretically to be great circles on the same pitch sphere. However, each gear of the pair must of course have its own respective theoretical pitch surface (in order to account for relative motion between the gears), so each gear should also be thought of theoretically as having its own respective pitch surface in the form of a respective one of a pair of respective pitch spheres which have coincident centers and radii which are substantially identical but which permit each pitch sphere to rotate about its respective axis. Therefore, each pitch circle can also be considered theoretically to be, respectively, a great circle on a respective one of these substantially identical pitch spheres so that the pitch circles of the gear pair effectively intersect with each other at two points separated by 180° (i.e., "poles"), and the axes of rotation of the two respective pitch spheres intersect at the coincident centers of the two pitch spheres at all times and at all angles of intersection.

For this primary organization of our invention, we use a first gear with internal teeth having a predetermined pitch circle, and then mate it with a second gear with external teeth and having a pitch circle identical to the first gear. The gears have mating teeth that are in mesh at two areas centered 180° apart; and, since their pitch circles are the same size, they rotate at a 1:1 ratio.

The invention can also be organized to transmit rotary motion at a 1:1 ratio using two external gears, or to transmit rotary motion at ratios other than 1:1. In disclosed embodiments of this latter type of organization, the effective pitch circles of the gears are each, respectively, a great circle on a respective one of two differently-sized spheres that share one point of tangency, the smaller of the two spheres being positioned either inside or outside the larger sphere. However, in these embodiments, the gears share only a single meshing area in a manner similar to conventional internal or external gearing arrangements; and, of course, the axes of the gears are in parallel planes so that the variable angles of intersection between the axes are measured by projecting one plane upon the other.

For use with either of these just-described organizations of our variable-angle gear system, four different gear tooth designs are disclosed, namely: a circle/tangent ("CT") design, a circle-on-diamond ("CD") design, a "lune" design, and a lune/inverse-curve ("L/IC") design, all of which are described in detail below. All of these designs permit the axes of the gears to variably intersect throughout a range of angles measuring from each side of 180° up to some preferred maximum angle, and all share a common feature: At least the central portion of the lengthwise tooth surface of each mating tooth, when viewed on a pitch surface of its gear, is an arc of a single circle with a diameter selected so that, when said gears are rotating in a driving and driven relationship, the intersecting axes can be varied continuously throughout this preferred range of angles. [NOTE: For each of our gears, its respective "pitch surface" is a pitch sphere.]

In the CT and CD designs (and in one gear of the pair in the L/IC combination), only the central portion of each tooth, when viewed in the pitch plane, is formed with the arc of a single circle; while in the lune design, the entire lengthwise curvature of each tooth surface is the arc of a single circle.

In the preferred designs for our gears, a diametral pitch is selected so that, when the axes of the gears are inclined to each other at the maximum preferred angle, two or more of the mating teeth of each gear will be in mesh simultaneously at each of the meshing areas shared between the gears. As in conventional gearing design, tooth thickness is selected to assure that expected loads will be safely transmitted by the number of teeth in mesh.

In the CT and CD designs, the central portions of both tooth surfaces of each mating tooth, when viewed in a pitch plane, are respective arcs that form the opposite sides of a single circle of predetermined diameter.

In the lune design, the arc that forms the entire lengthwise curvature of each tooth surface is also taken from a single circle of predetermined diameter. However, in the lune design, the circle is identical to a particular circle formed on the surface of a particular sphere, and its diameter subtends an angle, measured from the center of the sphere, equal to the maximum desired angle of intersection between the gear axes. The lune design for 1:1 arrangements is a circle formed on the sphere on which the pitch circles of each gear are great circles; and for arrangements other than 1:1, the circle is formed on the larger of the two intersecting spheres.

The CT, CD, and L/IC designs are preferred for embodiments in which the gears may drive and be driven in either direction, since the CT, CD, and L/IC teeth operate satisfactorily with no backlash (i.e., with only minimal assembly tolerance). In contrast, the lune teeth mesh without backlash only when the axes of the gears intersect at the maximum desired angle. The backlash between the lune teeth increases to a maximum when the shaft axes are aligned at 180°. Therefore, the lune design is not practical where large backlash would create operating problems.

For 1:1 arrangements, the teeth of the gears can be made with straight-sided profiles between top and bottom lands, because (a) the mating teeth do not "roll" relative to each other but rather, in a manner somewhat similar to hypoid gears, share sliding contact, and (b) the straight tooth sides lengthen the contact pattern on the mating teeth. Further, as will be apparent from the detailed description below, an involute profile would be relatively incompatible with the CT, CD, and L/IC designs.

However, involute profile is quite compatible with the lune design, and such involute profile is necessary for arrangements other than 1:1, because the teeth must roll together as well as slide past each other. In addition, the involute profile may be desirable in certain 1:1 arrangements in which the gears do not transmit rotational motion but only nutate.

The basic tooth designs of the invention are disclosed in detail along with various applications of the invention in novel CV-joint structures with features that combine a wide range of angular articulation in all planes with remarkable reductions in size and weight as well as ease of lubrication.

DRAWINGS

Figure 2:
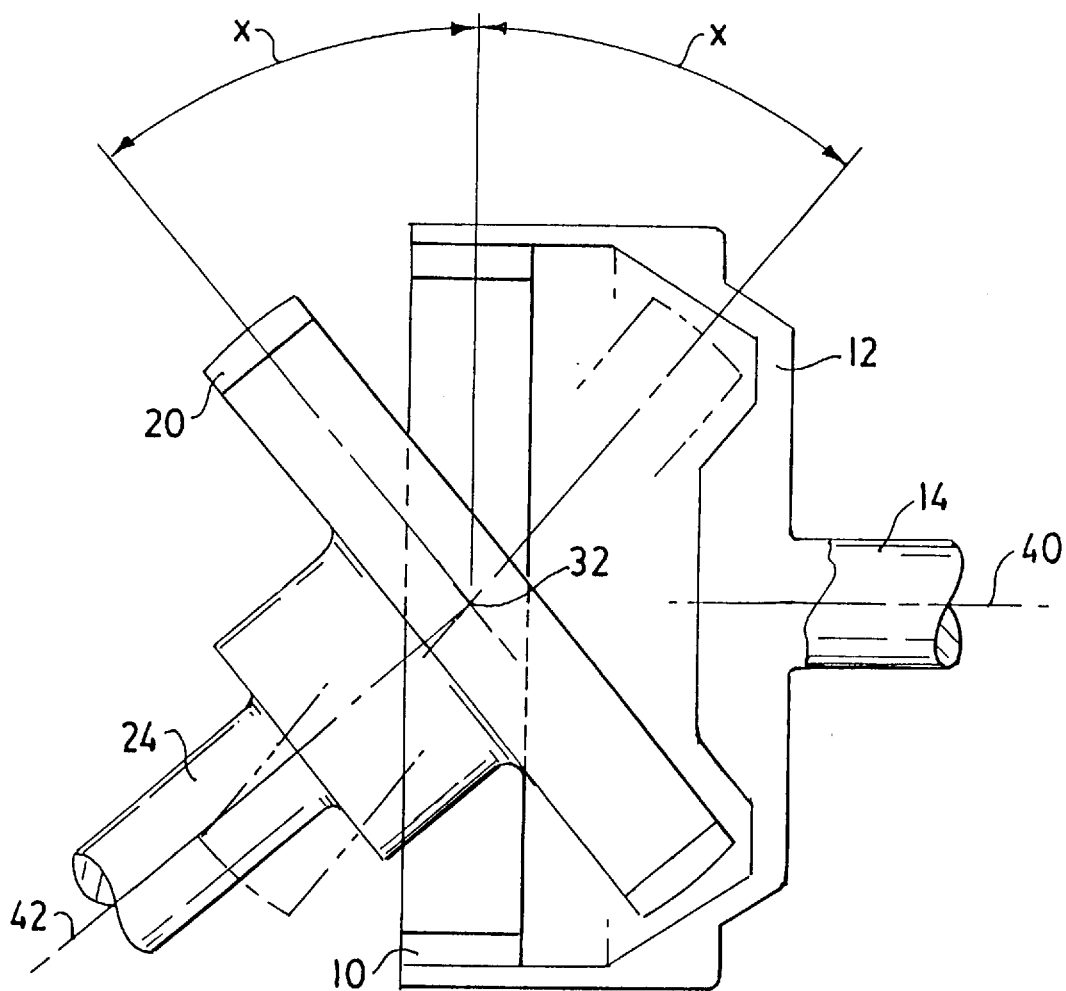
FIG. 2 is a symbolic partial view representing just the gear and shaft portions of the gear system of FIG. 1, but showing the axes of the gears intersecting at a preferred maximum angle.
Figure 3A:
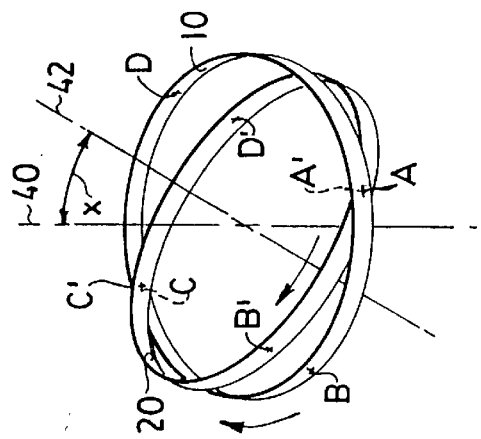
Figure 3B:
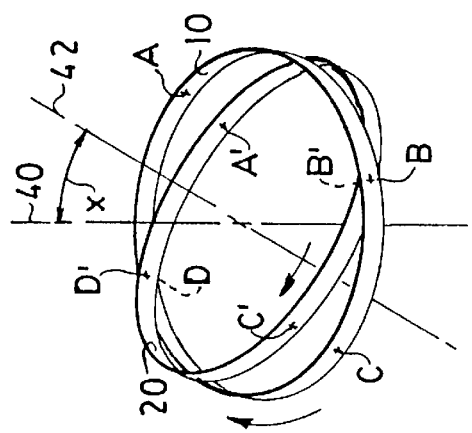
Figure 3C:
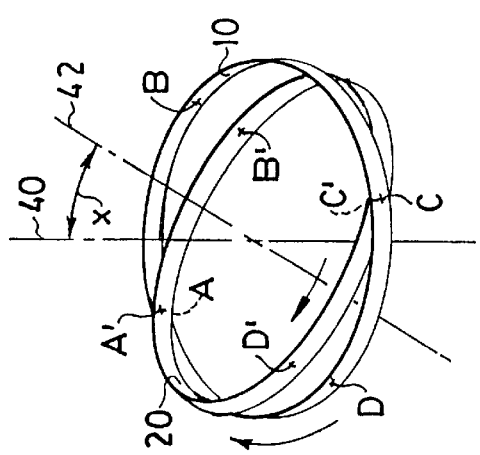

FIGS. 3A, 3B, and 3C illustrate schematically the relative motion between sets of tooth contact points on the pitch surfaces of a pair of rotating mating gears arranged in the manner generally indicated in FIG. 2.

Figure 4:
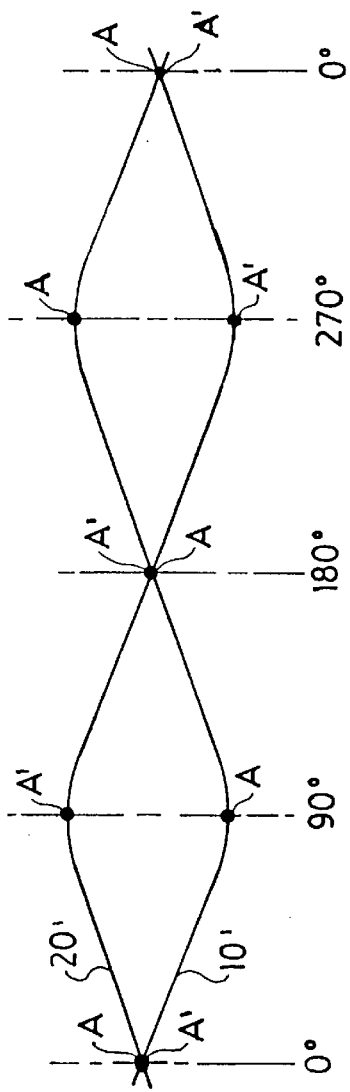

FIG. 4 is a graphic-type representation of the relative motion between one of the respective sets of tooth contact points illustrated in FIGS. 3A, 3B, and 3C.

Figure 1:
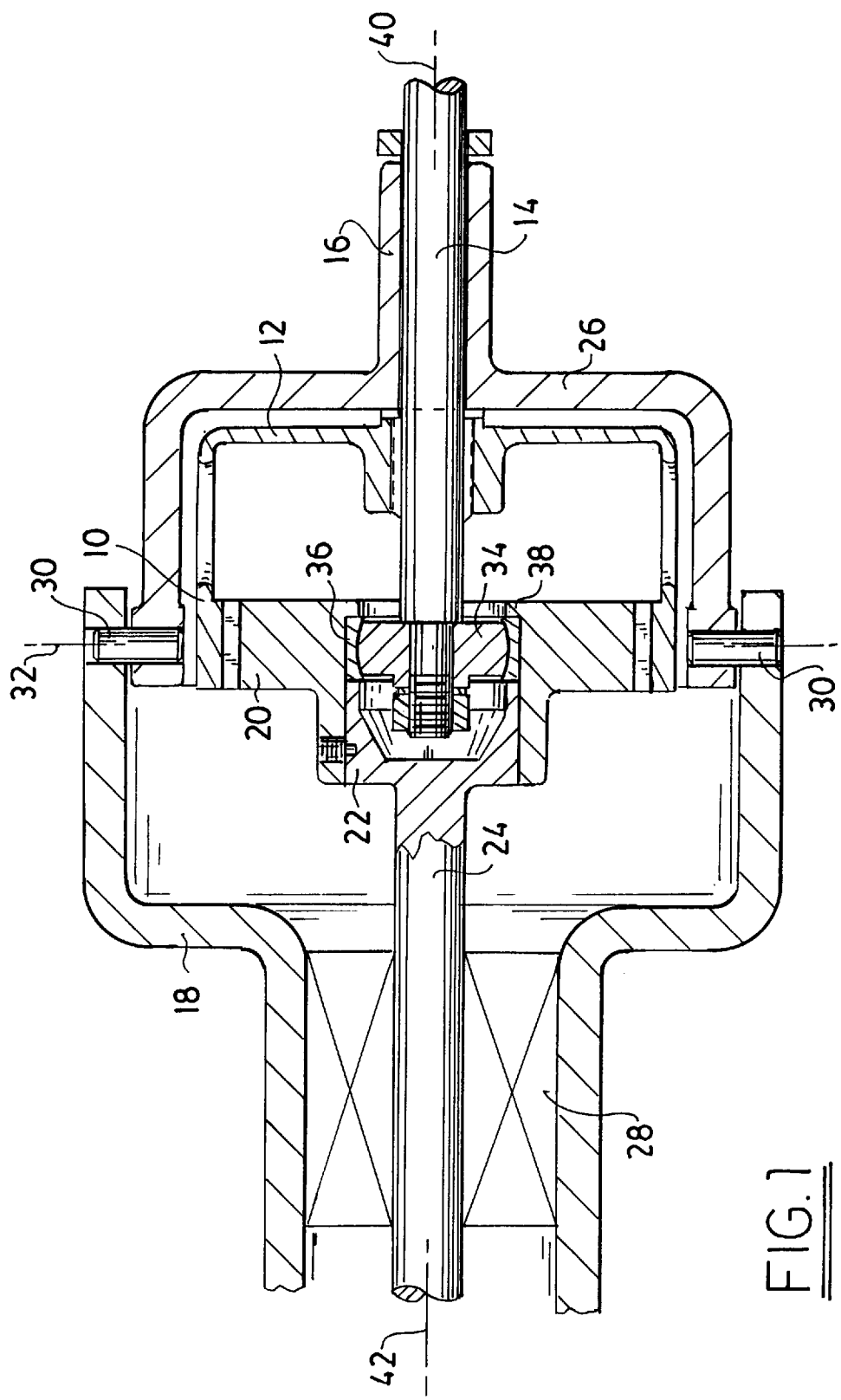
FIG. 1 is a schematic and partially cross-sectional view of a pair of gears according to a first arrangement of the invention for transmitting rotational forces at a 1:1 ratio between a pair of shafts aligned on variably-intersecting axes, the gears being mounted within respective support frames and the respective shafts shown with their axes in 180° alignment.
Figure 5B:
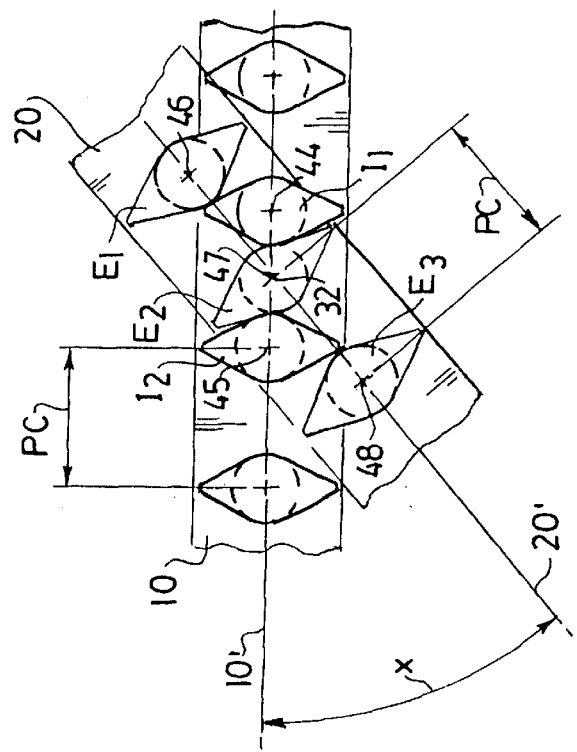
Figure 5A:
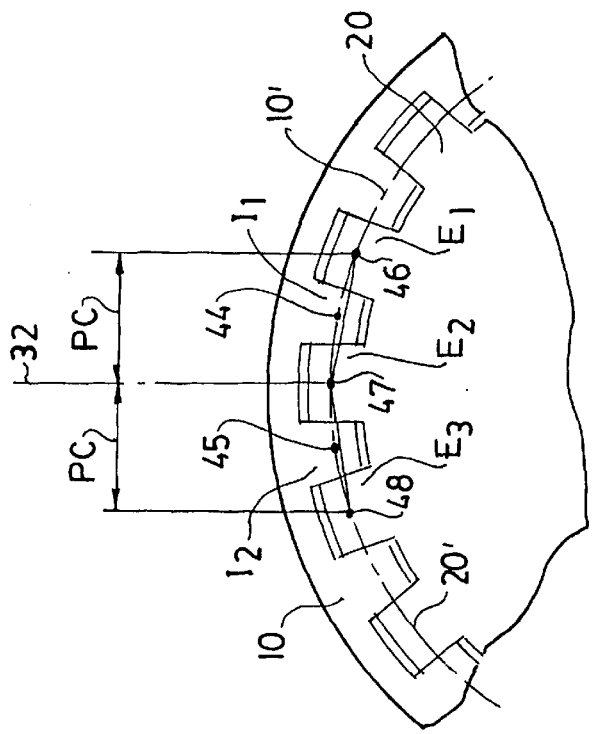

FIG. 5A is a schematic representation of a portion of the pair of mating gears of FIG. 1, showing the gears with their respective axes aligned at 180° and indicating the projected chordal center distance between successive teeth on the pitch circle of each gear; and FIG. 5B is a schematic representation of a portion of the same pair of gears variably intersecting (as in FIG. 2) at a selected maximum preferred angle x, showing their meshing teeth in a modified flat projection as the gears rotate about their respective axes.

Figure 6:
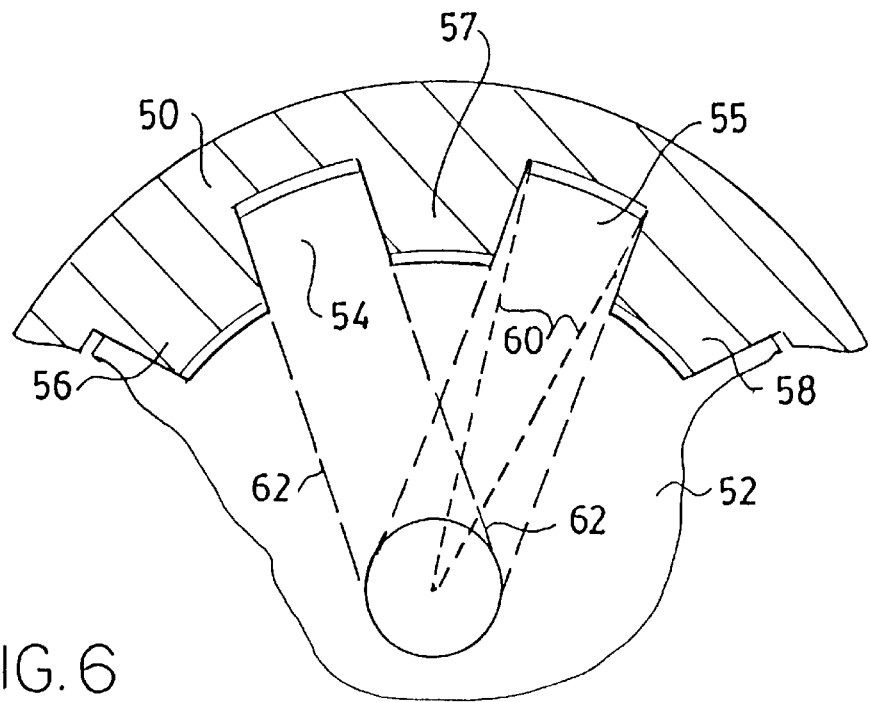

FIG. 6 is a schematic representation of the partial outline of the meshing teeth of a pair of gears according to the invention taken in the radial center plane of the gears with axes aligned at 180°.

Figure 7:
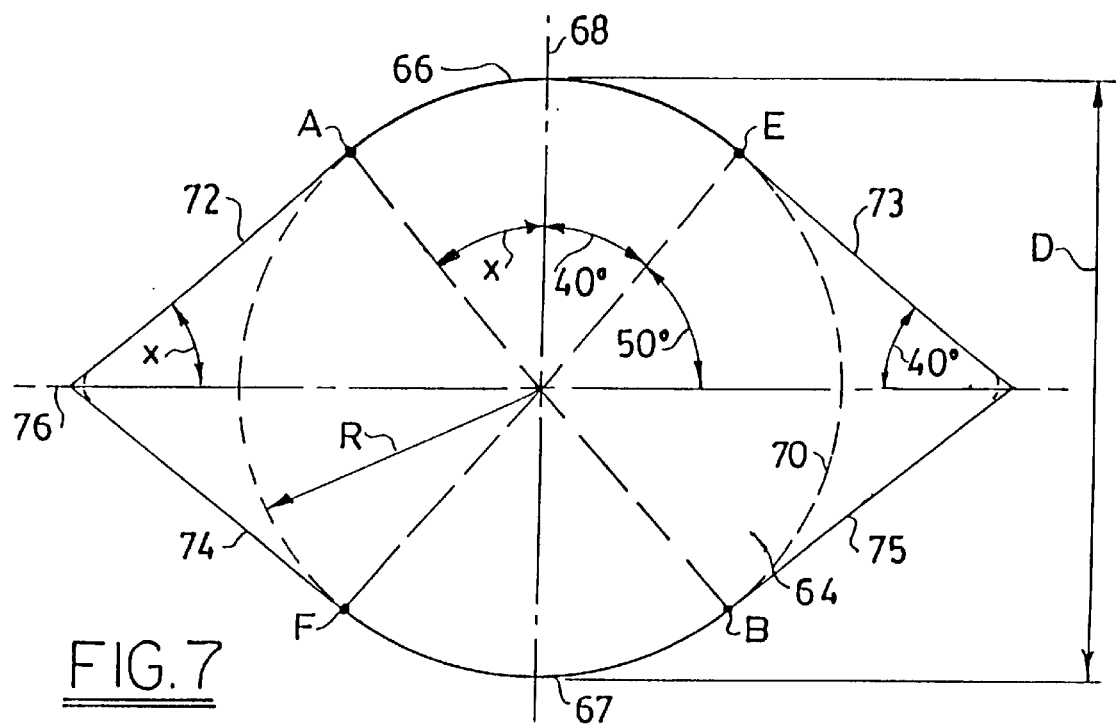

FIG. 7 is a schematic representation of the outline of a gear tooth according to the invention's CT design, the outline being shown in a pitch plane of its gear.

Figure 8C:
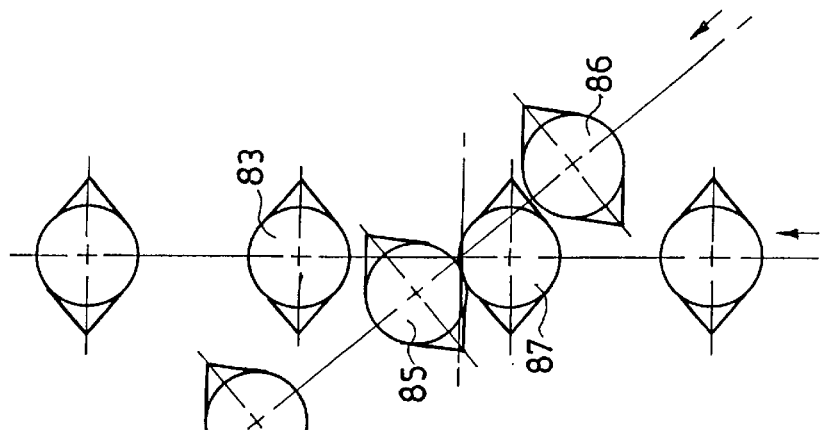
Figure 8B:
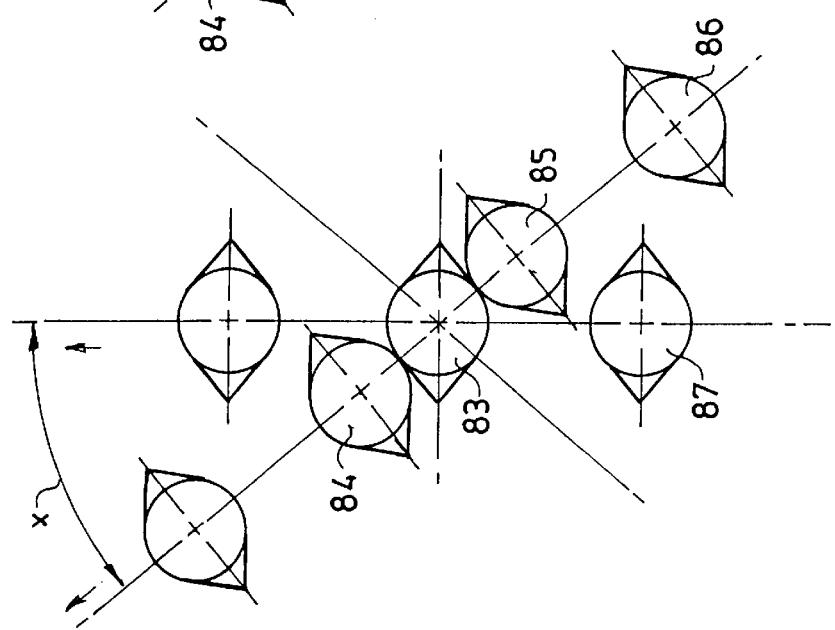
Figure 8A:
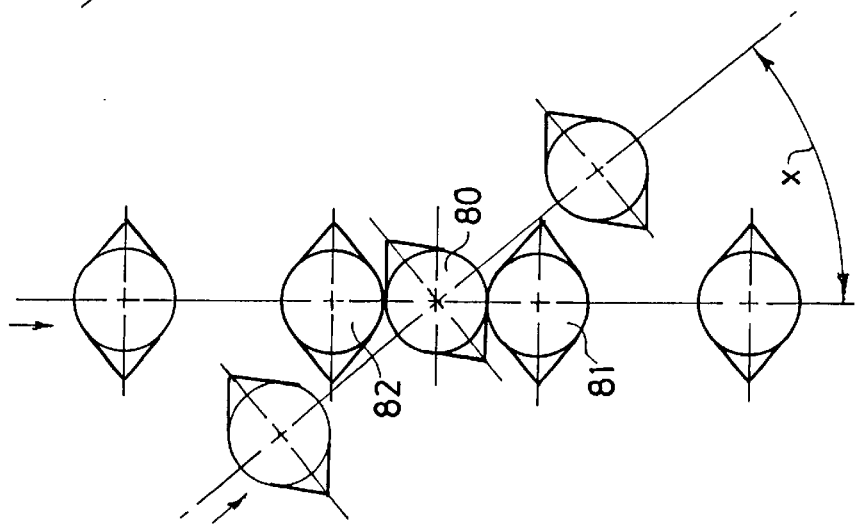

FIGS. 8A, 8B, and 8C are schematic representations of the outlines of the meshing teeth of a pair of gears according to the invention's CT design, the outlines being shown in modified flat projections, and the pair being shown with their axes intersecting at the preferred maximum angle x; FIG. 8A represents a first one of the gear pair's meshing areas, while FIG. 8B shows the second meshing area at the same instant in time; and FIG. 8C represents the second meshing area shown in FIG. 8B after the gears have each rotated a further distance of three-quarters of the circular pitch.

Figure 9B:
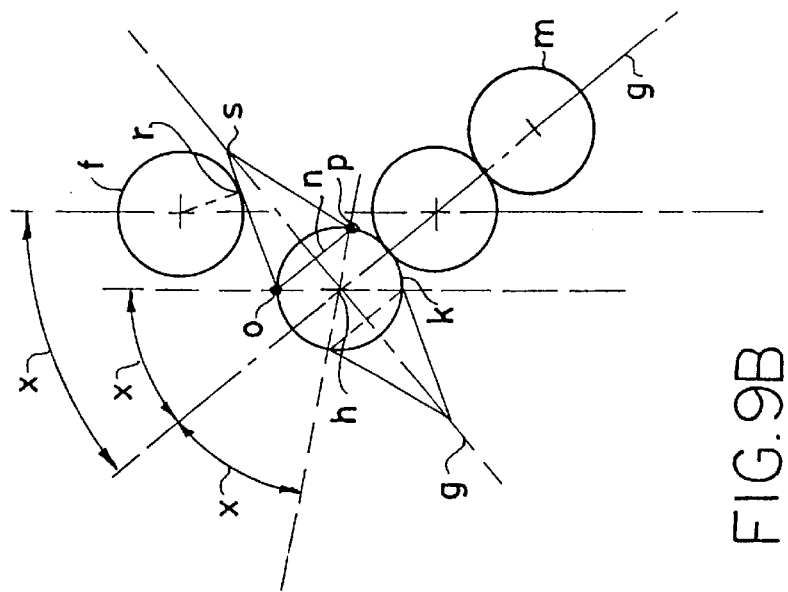

FIGS. 9A and 9B show geometric constructions for determining the tooth shape of a pair of gears according to the invention's CD design.

Figure 10:
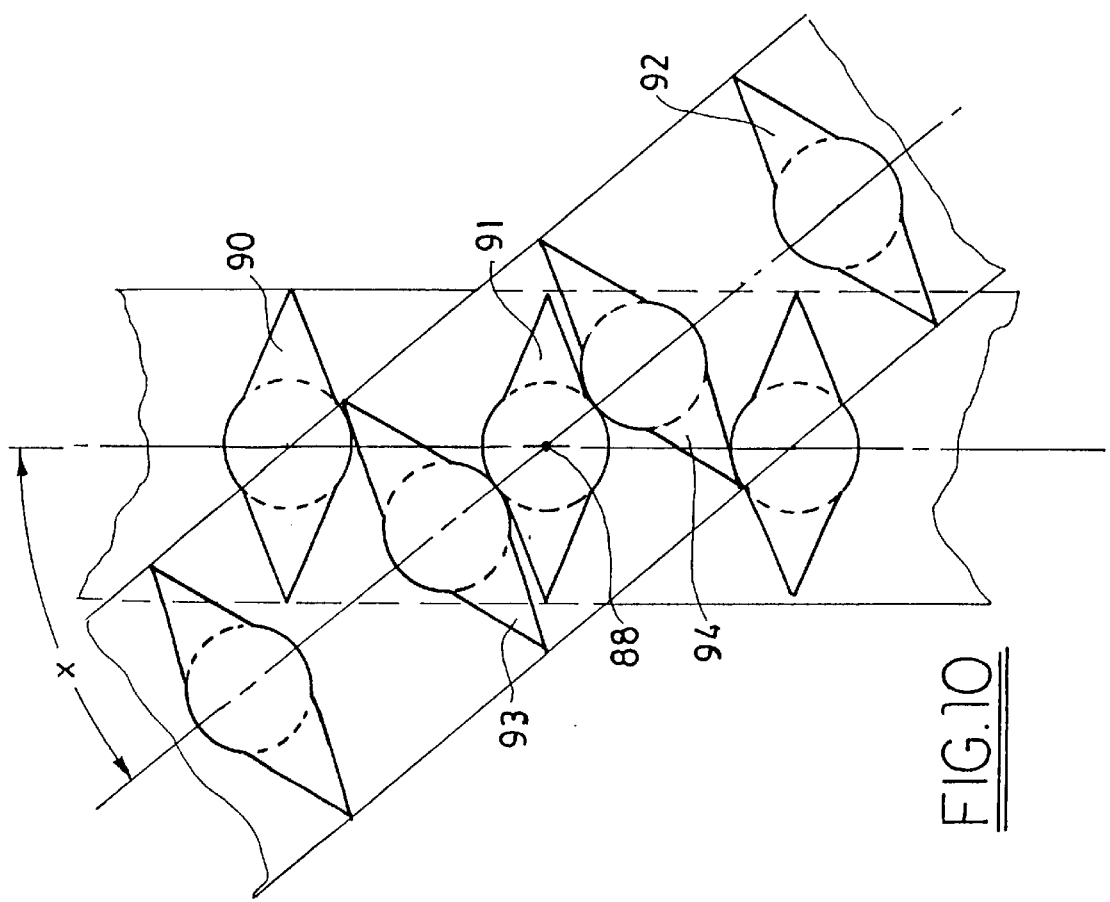

FIG. 10 is a schematic representation of the outlines of the meshing teeth of a pair of gears according to the invention's CD design, the outlines being shown in modified flat projections.

Figure 11:
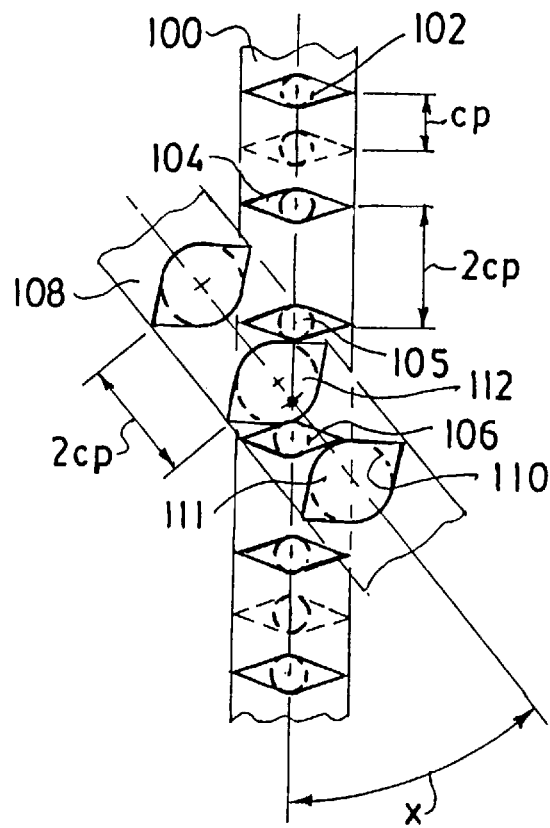

FIG. 11 is a schematic representation of the meshing teeth of a further pair of gears according to a further shape variation that is applicable to either the invention's CT or CD designs, the meshing teeth being shown in outline in modified flat projections.

Figure 12:
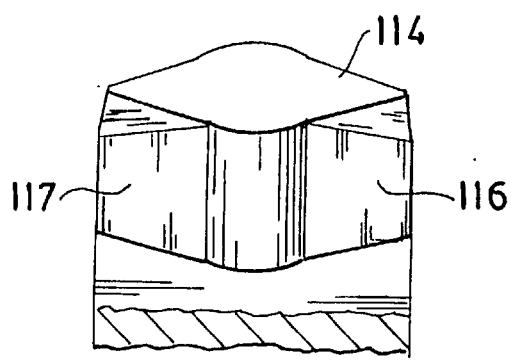

FIG. 12 is a schematic representation of the very slight tip relief clearance required on CD and CT design teeth, the tip relief being shown greatly exaggerated in the the illustration.

Figure 13B:
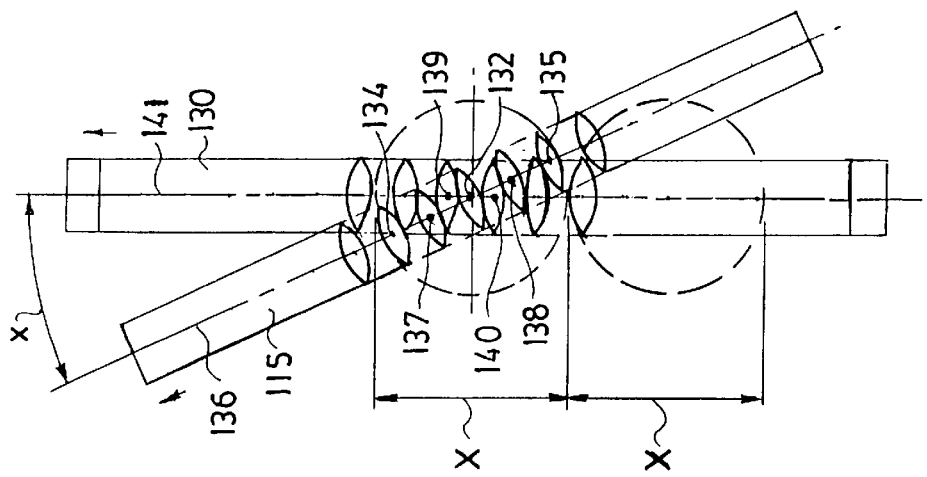
Figure 13A:
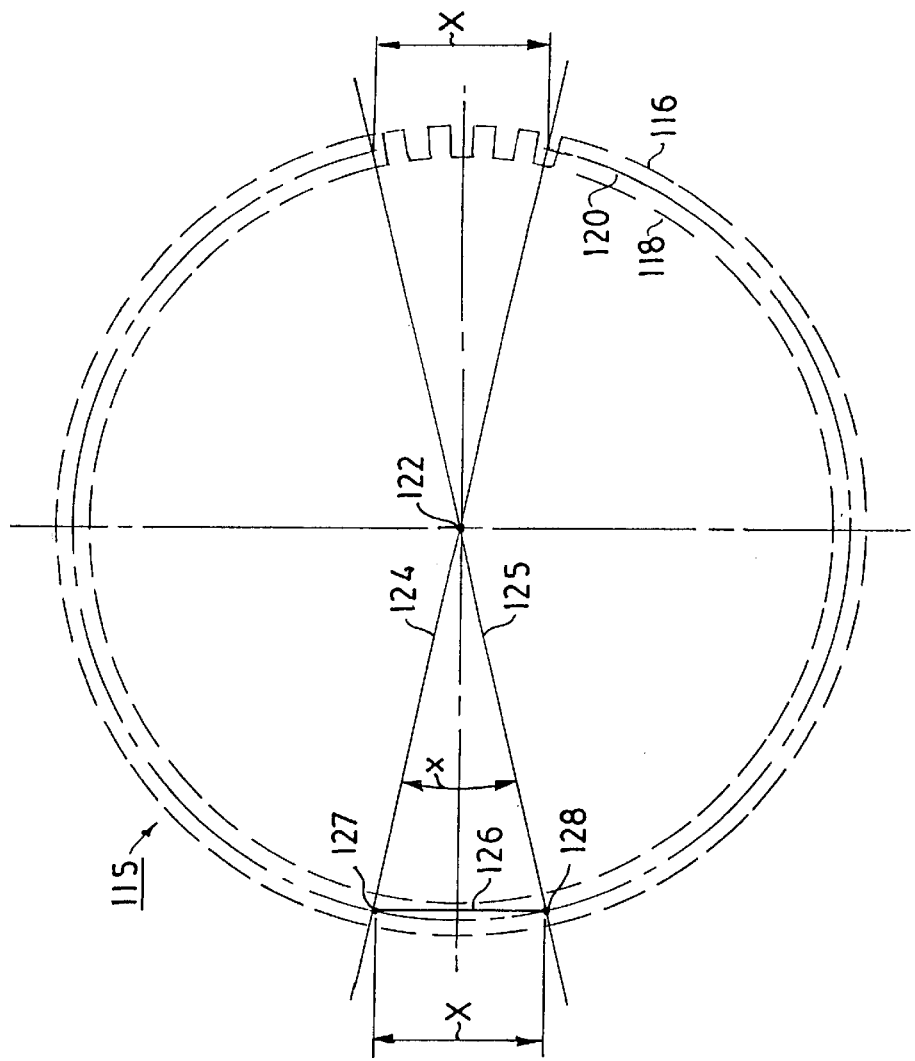

FIGS. 13A and 13B are schematic representations of gear teeth shaped according to the invention's "lune" design, FIG. 13A showing the geometric construction for determining the circular arc that forms the lengthwise curvature of each tooth face, and FIG. 13B showing two sets of meshing teeth as the gears rotate about respective axes variably intersecting at a selected maximum angle, the outlines of the gear teeth again being shown in modified flat projections.

Figure 14A:
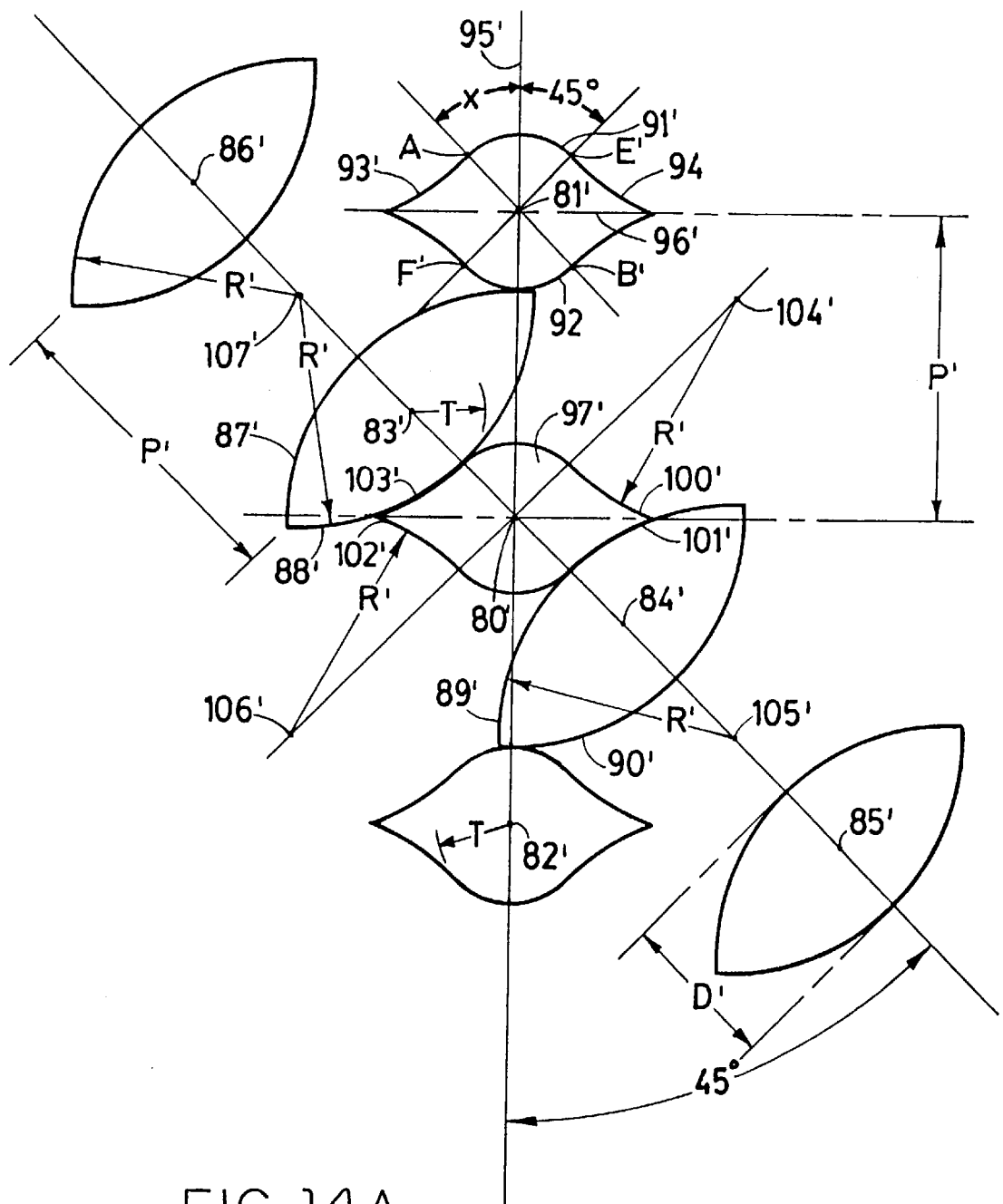
Figure 14B:
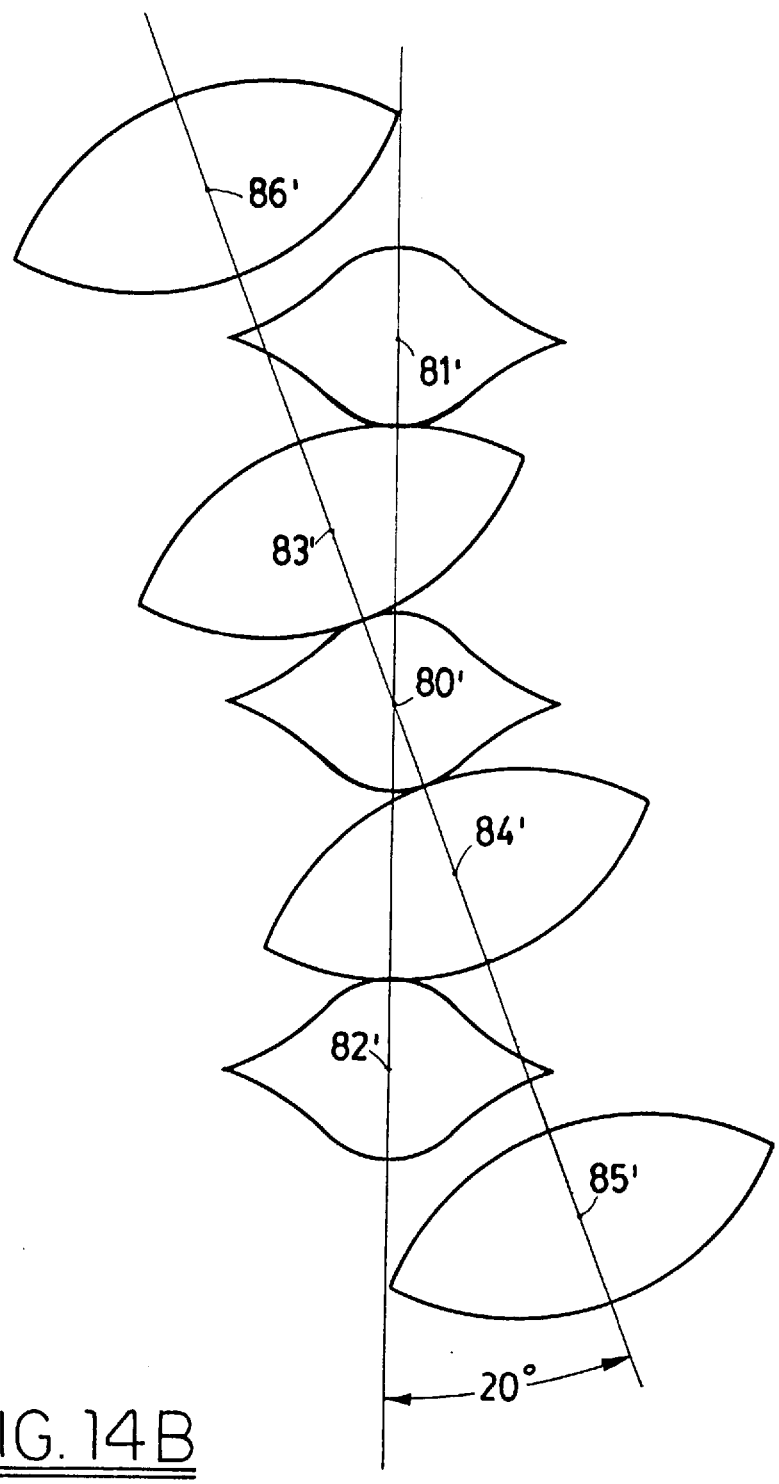

FIGS. 14A and 14B are schematic representations of the outlines of the meshing teeth of a pair of gears according to the invention's L/IC design, the outlines being shown in modified flat projections of the pair; in FIG. 14A the axes of the gears are intersecting at a preferred maximum angle, while in FIG. 14B the axes are intersecting at 20°.

Figure 15:
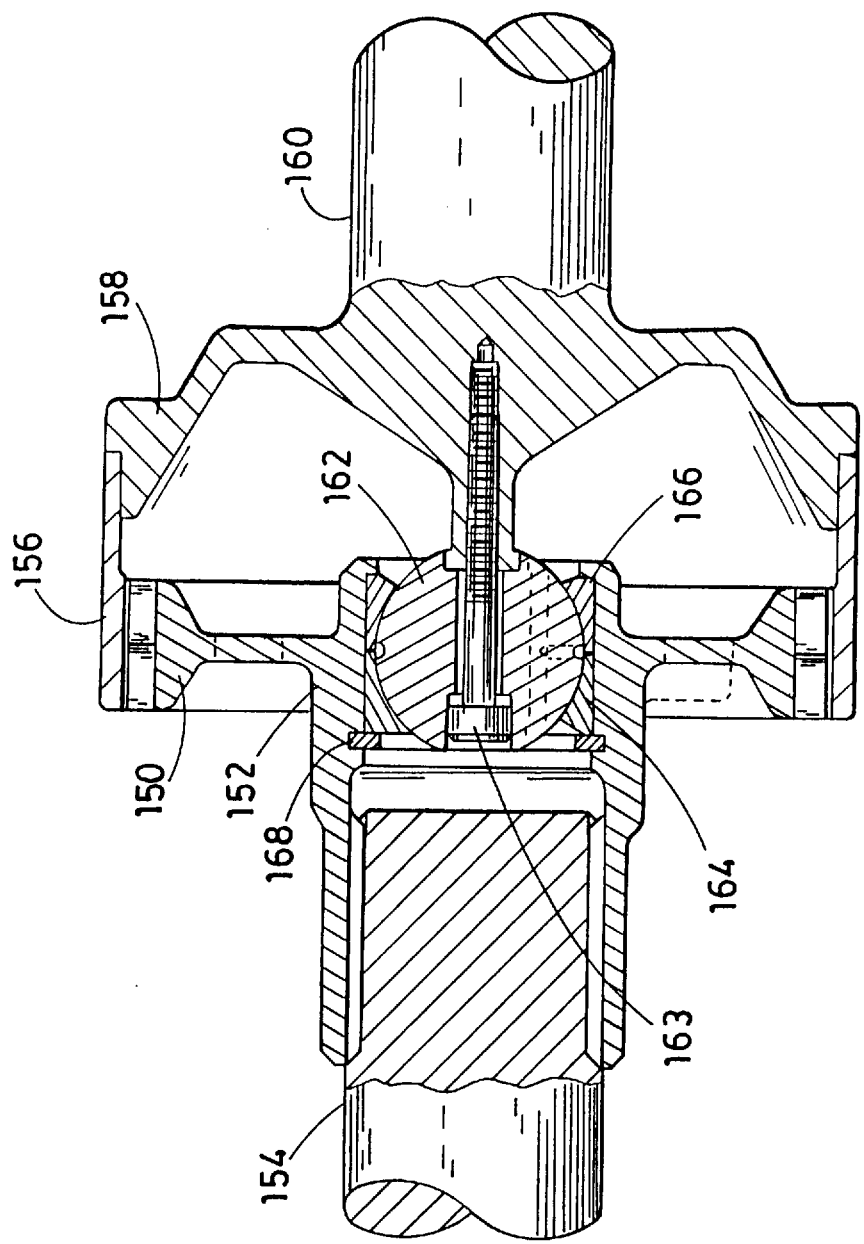

FIG. 15 is a schematic and partially cross-sectional view of a first embodiment of a constant-velocity joint according to the invention.

Figure 16:
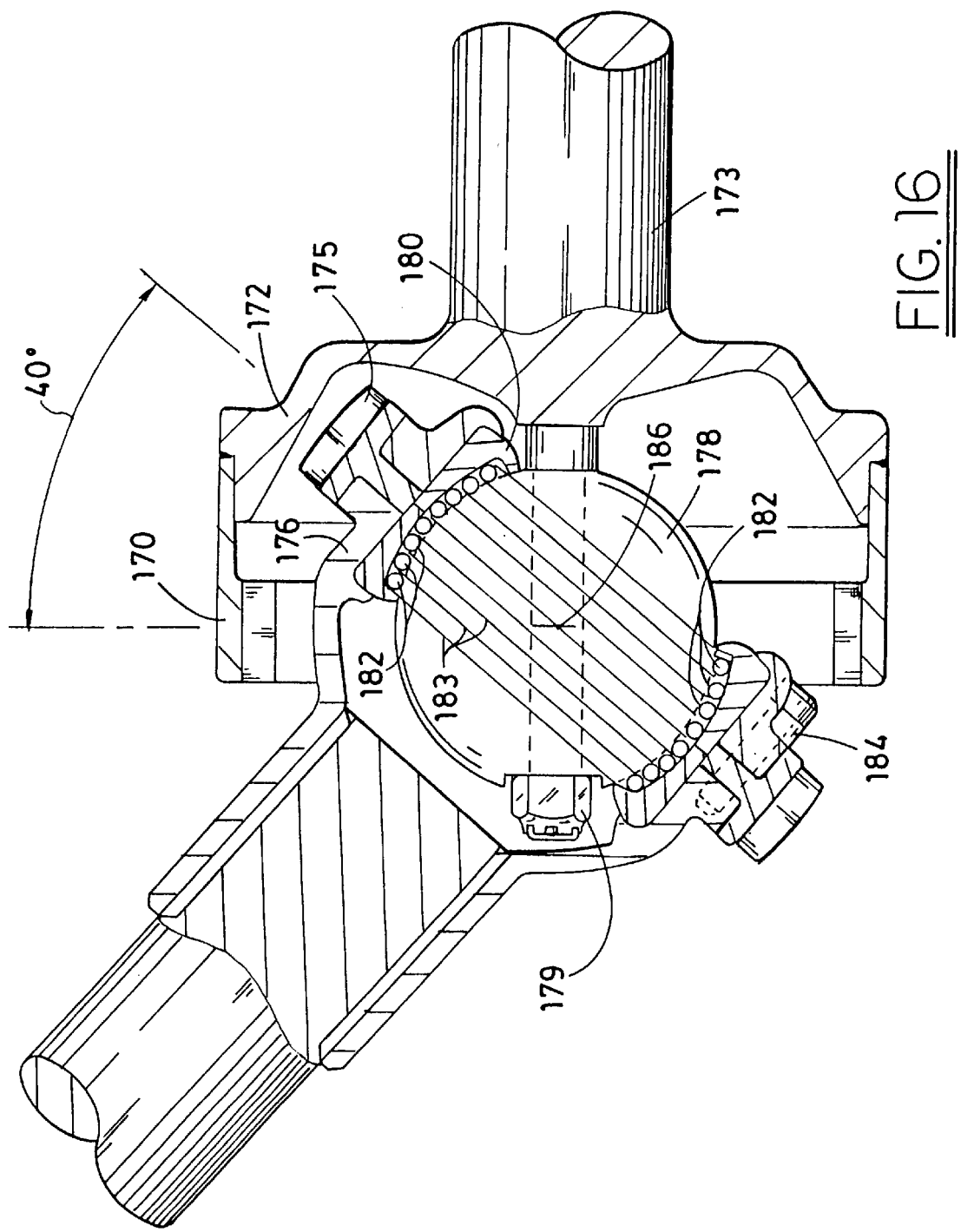

FIG. 16 is a schematic and partially cross-sectional view of another embodiment of a constant-velocity joint according to the invention, this embodiment being preferred for use under high speed and high torque conditions.

FIG. 17 is a schematic representation of two constant-velocity joints, similar to that shown in FIG. 15, incorporated in an articulated drive shaft assembly.

FIG. 18 is a schematic representation of a constant-velocity joint, similar to that shown in FIG. 15, incorporated in a steered drive-axle for a vehicle.

Figure 19:
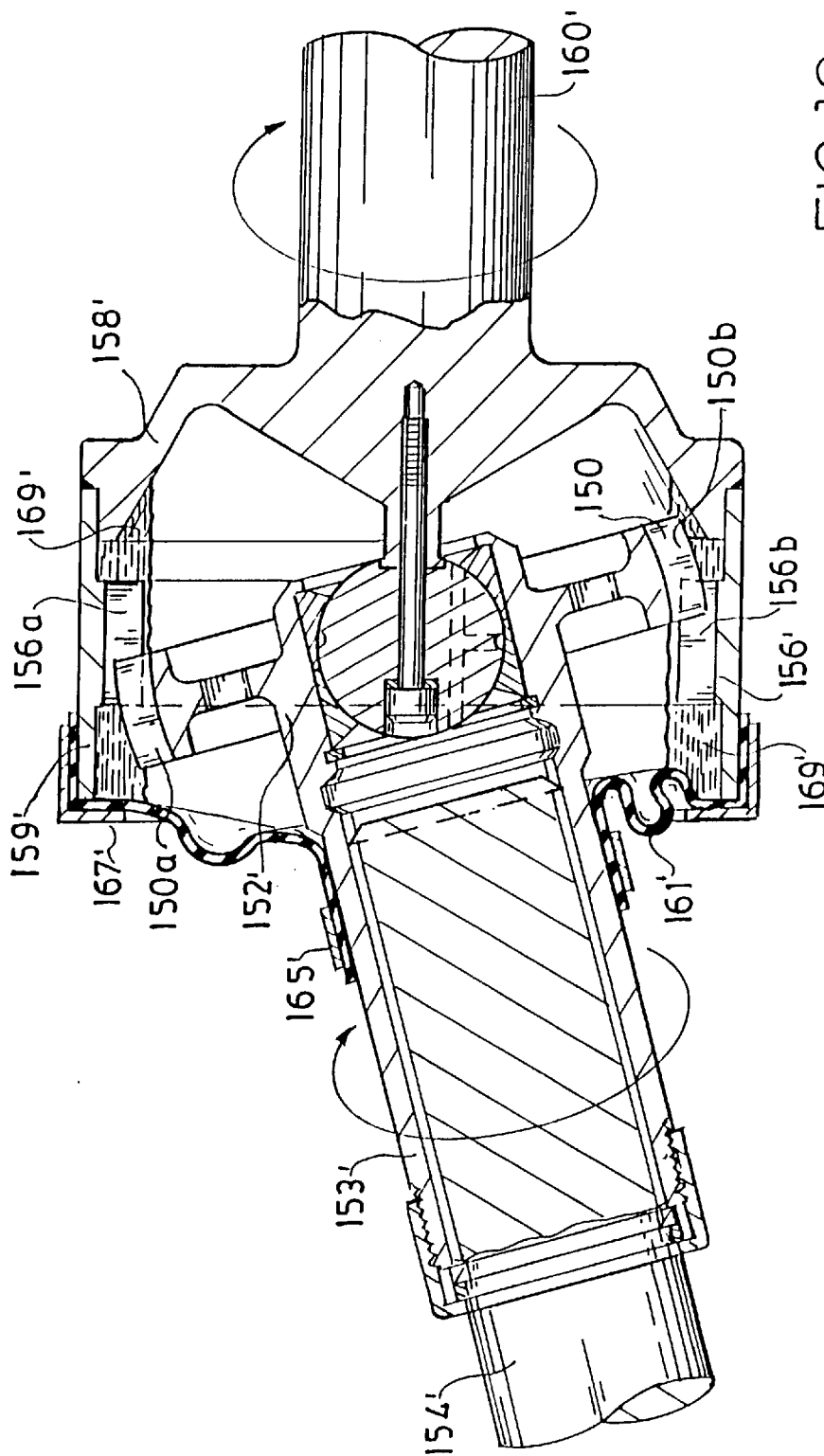

FIG. 19 is a schematic and partially cross-sectional representation of a rotating constant-velocity joint similar to that shown in FIG. 15, the joint being articulated in the plane of the paper and including an encapsulating boot and lubricating fluid.

Figure 20A:
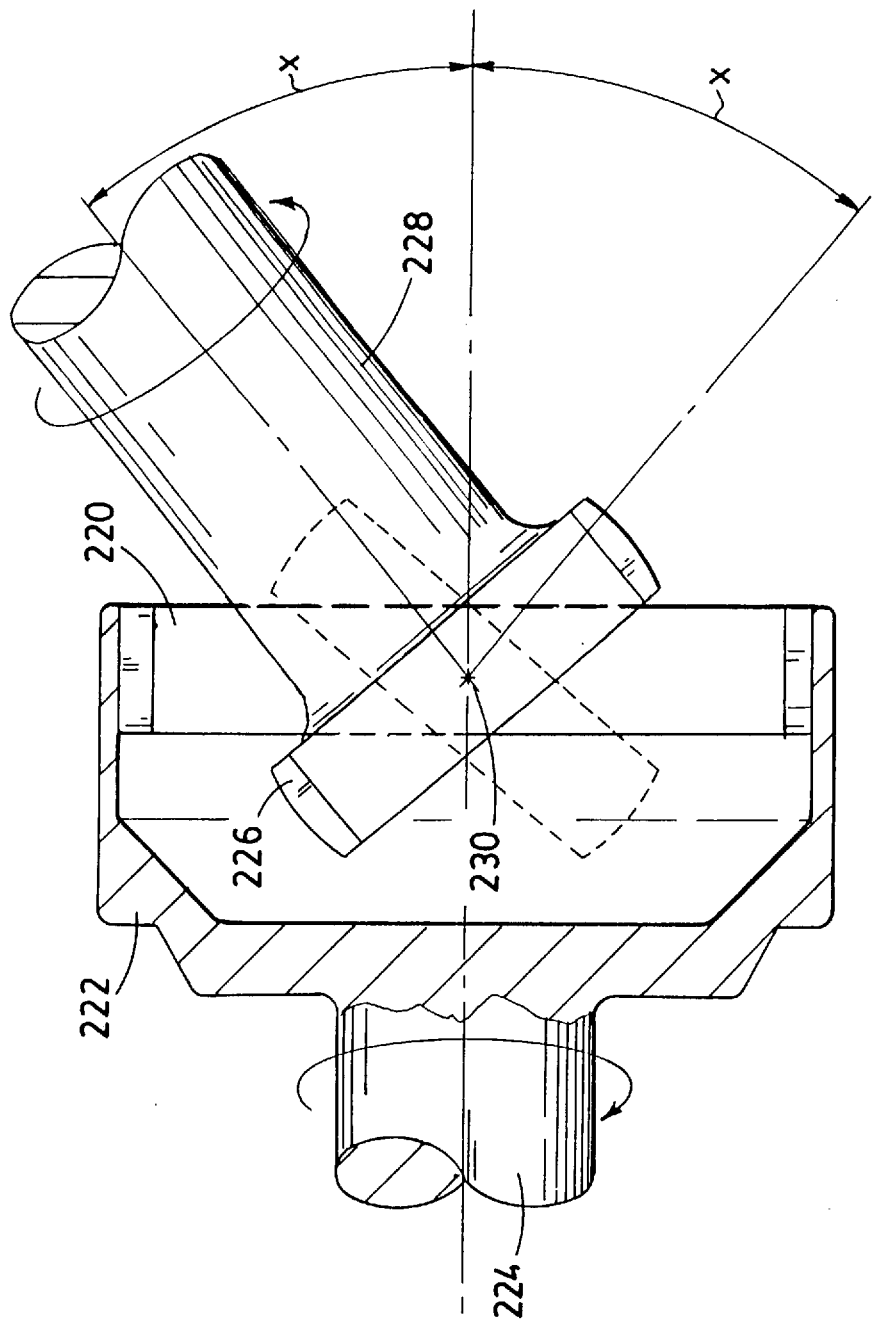
Figure 20B:
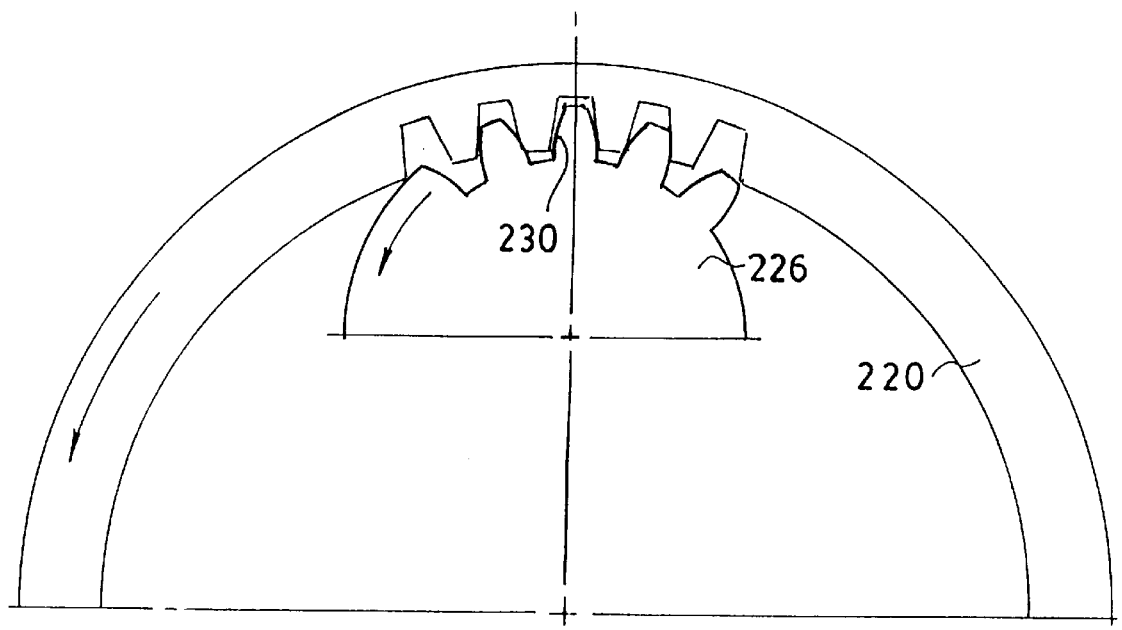

FIGS. 20A and 20B are schematic representations of two views of a further embodiment of the inventive gear system in an arrangement for transmitting rotational forces at a ratio other than 1:1, FIG. 20A showing a top view of an internal/external gear pair supported on shafts intersecting at an angle less that 180°, and FIG. 20B showing an end view of only the gears of the same pair when their respective shafts are aligned at 180°.

Figure 21:
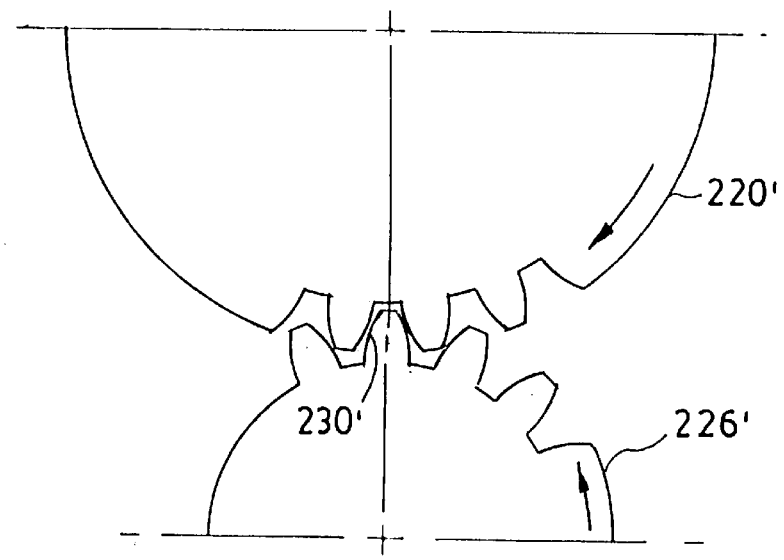

FIG. 21 is a schematic representation of still another arrangement of the inventive gear system for transmitting rotational forces at ratios other than 1:1, this embodiment using only external gearing.

DETAILED DESCRIPTION OF PREFERRED EMBODIMENTS

Gear System

FIGS. 1 through 5B illustrate various features of a pair of gears in a first arrangement of the invention for interconnecting a pair of rotating shafts. In FIG. 1, which is a schematic and partially cross-sectional view of this first arrangement, an internal gear 10 fixed to a cup-like support 12 is splined to a shaft 14 held in a journal 16 of a carrier 26. A mating external gear 20 is fixed for rotation to the hub 22 of a second shaft 24, the latter being supported in a housing 18 for rotation in an appropriate bearing 28. Carrier 26 is itself pivotally mounted to housing 18 by pins 30 for rotation about axis 32.

In FIG. 1, shafts 14 and 24 are shown with their respective axes 40, 42 positioned in 180° alignment. (A portion of the teeth of gears 10 and 20 are shown in this 180° alignment in FIG. 5A.) In this position, the teeth of gears 10 and 20 mesh together in the same manner as the teeth of a geared coupling.

A spherical bearing, comprising interior member 34 and exterior member 36, maintains the mating gears 10 and 20 in proper meshing relationship. Namely, interior member 34 is bolted to the end of shaft 14, while exterior member 36 is captured between hub 22 and a lip 38 on the interior of gear 20.

FIG. 2 represents, symbolically, just the gear and shaft portions of the gear system shown in FIG. 1. However, in FIG. 2 the axes 40, 42 of shafts 14 and 24, respectively, are shown intersecting at a "preferred maximum angle" (i.e., at some predetermined maximum shaft angle x up to which the shaft axes may variably intersect while rotational forces are being transmitted).

Gear 20 is shown in solid lines pivoted about axis 32 at an angle x in a first direction, and it is shown in phantom lines pivoted about axis 32 at an angle x in the opposite direction. This illustrates the wide angular range of intersection through which the gear pair may be variably pivoted while rotational forces are being satisfactorily transmitted. At all times during such variable angular relative motion between the shaft axes, gears 10 and 20 remain in mesh at respective meshing areas, the center of each meshing area being located at one of the two respective points at which the gears' respective pitch circles intersect with axis 32.

In this basic first arrangement shown in FIGS. 1 through 5B, our gears 10, 20 function in a manner similar to known gear couplings in that they do not rotate relative to each other as their respective shafts rotate at a 1:1 ratio. However, whenever the angular orientation of their respective shafts is variably adjusted out of 180° alignment (as shown in FIG. 2), the teeth of the gears continuously move into and out of mesh even though the gears rotate at all times at the same speed.

This relative movement of the teeth of gears 10, 20, into and out of mesh, is shown schematically in FIGS. 3A, 3B, and 3C which represent, respectively, three different positions of relative gear rotation about axes 40, 42 when axes 40, 42 are intersecting at some preferred maximum angle x. FIGS. 3A, 3B, and 3C show the relative advancement of four different respective sets of tooth contact points as the mating gear teeth move into and out of mesh.

In FIG. 3A, a tooth contact point A on internal gear 10 is in mesh with tooth contact point A' on external gear 20; and, simultaneously, a tooth contact point C on internal gear 10 is in mesh with a tooth contact point C' on external gear 20. FIG. 3B shows the same tooth contact points on each gear after the gears have rotated at 1:1 for a quarter of a rotation, the gear tooth contact points D and B of gear 10 and points D' and B' of gear 20 now being in meshing contact. Following a further quarter turn, as shown in FIG. 3C, tooth contact points A, A' and C, C' are once again at mesh, but at a relative position 180° from their initial contact position shown in FIG. 3A.

The tooth contact points represented in FIGS. 3A, 3B, and 3C are all located on the pitch circles of their respective gears; and, geometrically, these pitch circles are each great circles on the same sphere. All great circles intersect each other at two positions 180° apart. FIG. 4 is a schematic representation of the relative motion between one of the respective sets of tooth contact points illustrated in FIGS. 3A, 3B, and 3C, namely, tracing the movement of tooth contact points A, A' along their respective pitch circles 10', 20' as gears 10, 20 make one full revolution together. Although the respective pitch circles are shown in flat projection, it can be seen that each tooth contact point traces a lemniscate-like pattern (a "figure-eight on the surface of a sphere"); and, as is well known in the universal joint art, such lemniscate motion is essential when transferring constant velocity between two articulated shafts.

As indicated above, FIG. 5A schematically represents a portion of the pair of mating gears of FIG. 1, showing internal gear 10 and external gear 20 with their respective axes aligned at 180°. In this position, respective pitch circles 10' and 20' are coincident. Indicated on the coincident pitch circles are tooth centers 44 and 45 of internal gear teeth $I_1$ and $I_2$, respectively, and tooth centers 46, 47, and 48 of external gear teeth $E_1$, $E_2$, and $E_3$, respectively. Also shown are the projected chordal center distances PC between successive tooth centers 46, 47 and tooth centers 47, 48.

FIG. 5B schematically represents approximately the same portion of gears 10, 20 as shown in FIG. 5A. However, in FIG. 5B, the gears are shown variably intersecting (as in FIG. 2) at selected maximum preferred angle x, and the gear teeth are represented in modified unwound flat projections of the pitch spheres of each respective set of gear teeth. The flat projections are modified so that the center distance between successive teeth on each flat projection equals the projected chordal distance PC between tooth centers.

[NOTE: With reference to the flat projections and plane geometric constructions used to illustrate our tooth forms, it must be remembered our gear system is based upon spherical geometry. That is, the projections onto the flat surfaces of our drawings represent lines on the surface of the respective sphere on which the pitch circle of the gear is a great circle. For instance, referring to the representation of the internal/external gear combination in FIG. 5B, the flattened projections of the teeth of gears 10 and 20 can be theoretically considered to be either on the surface of the same pitch sphere or, as indicated above, on the respective surfaces of one of a pair of respective pitch spheres having substantially equivalent radii and coincident centers.]

As can be seen in FIG. 5B, when gears 10, 20 are rotating together with their respective axes variably intersecting at the preselected preferred maximum angle x, the center of their meshing engagement is coincident with axis 32 about which the gears pivot relative to each other, and the load being transferred between the gears is shared by ten teeth. That is, while only five teeth are shown in meshing engagement in FIG. 5B, as explained above (and as can be seen in FIG. 1), gears 10, 20 are simultaneously in mesh at all times about two meshing centers located 180° apart.

Special attention is called again to the fact that gears 10, 20 do not roll relative to each other in the manner that mating spur and helical gears do in conventional gearing systems, and conventionally-designed gear teeth are not appropriate for our novel variable-angle gearing system for which we have developed unique gear tooth designs.

Gear Tooth Designs (a) Basic Design Elements

As indicated above, our variable-angle gearing system can be used for transmitting rotational forces at ratios other than 1:1. However, one of its primary applications relates to such 1:1 arrangements, and the following discussion is directed to the design of gear teeth appropriate for such arrangements.

Referring to FIG. 6, the partial outline of the meshing teeth of a pair of gears 50, 52 according to the invention is represented schematically; and, for clarity, external gear 52 is not shown in cross section. The axes of the gears are aligned at 180°, and the outline is taken in the radial center plane of the gears. Two external gear teeth 54, 55 are shown in full mesh with three internal gear teeth 56, 57, 58.

As can be seen in FIG. 6, the working surfaces of all the gear teeth are straight-sided. This is the preferred profile shape. As just explained above, whenever the axes of our gears are positioned out of the 180° alignment while the gears are rotating at a 1:1 ratio, the gears are constantly moving into and out of mesh about their two shared meshing centers. This movement causes the surfaces of the meshing teeth to slide over each other in a manner somewhat similar to the sliding contact that occurs between the meshing teeth of hypoid gears. The preferred straight-sided tooth surfaces create a full line of sliding contact through the mesh. Further, while the straight-sided teeth can be designed to follow radial lines 60, a spline shape (indicated by lines 62) is preferred.

There is another characteristic common to gear teeth according to our invention, and this will be illustrated by using as an example a gear tooth formed according to the invention's CT (circle-tangent) design. FIG. 7 is a schematic representation of the outline of a CT gear tooth 64, the outline being shown in a pitch plane of its gear. This CT tooth, like all teeth according to our invention, includes the following basic design characteristic: The central portions 66, 67 of the working surfaces of tooth 64, on each side of its radial center line 68, are formed by the arc of a single circle 70 having a diameter selected so that, when its gear is rotating in a driving and driven relationship with a mating gear according to our invention, the intersection of the axes of the mating gears can be varied continuously from an alignment of 180° throughout the range of angles extending to some preselected maximum preferred angle on each side of 180°. The circular arcs that form the central portions of the two working faces of each CT and CD tooth (and one of the teeth of the combination L/IC design) are formed from the same circle; however, while the two working faces of each lune tooth are also arcs of circles having the same diameter, they are not formed on the same circle. These features are discussed in greater detail below.

In addition, the diameter for the required single circle in all of our designs is selected to assure that more than two mating teeth shall be in mesh simultaneously about each of the meshing centers shared by the mating gears. The selection of the diameter of the single circle will be described, along with other parameters, in the following explanations of four preferred tooth designs for our invention.

(b) CT (Circle-Tangent) Tooth Design

As just explained above and as can be seen in FIG. 7, the design of our CT gear teeth begins with the selection of a single circle. This first step is approached in the same manner as is well known in the gearing art, namely, size and strength specifications for our gear pair are initially determined in accordance with the application in which our variable-angle gear system is to be used (e.g., as a CV joint for a steer/drive axle in an automotive light truck). The addendum circle (maximum diameter) of the gears may be limited by the physical space in which the gearing must operate, and a diametral pitch must be selected so that the normal chordal thickness of the teeth (i.e., the chordal thickness of each tooth along the pitch circle) is sufficient to permit the maximum expected load to be carried by the number of teeth in mesh.

In this regard, it is essential to remember that when using our gear system for transferring motion at a 1:1 ratio, a pair of our gears is capable of handling twice the load as a pair of conventional gears of the same size. That is, since our gear pairs share two meshing areas centered 180° apart, they have twice as many teeth in mesh as would a conventional gear of the same size, and a diametral pitch may be selected that provides a normal chordal thickness that is significantly smaller than would be conventionally required.

Referring again to FIG. 7, following the selection of an appropriate addendum size and diametral pitch, a single circle 70 is used to form the central portion of the tooth. Circle 70 has a radius R which produces a circle having the required normal chordal thickness D along radial center line 68.

Next, it is preferred to extend the lengthwise face width of each gear sufficiently to assure that more than two teeth will be in mesh about each of the two meshing centers shared by our gear pair. To accomplish this, an initial determination is made regarding the angular variability that will be required for the particular application. For instance: a universal joint designed for a specific truck drive shaft may require no more than 5°–10°, but even more than 40° of articulation may be needed in a steer-drive. As indicated above, we refer to this desired angular variability as the "preferred maximum angle x".

In the example illustrated in FIG. 7, it is assumed that the preferred maximum angle x is 40°. The angle x is marked off on each side of radial center line 68 (indicated by the construction lines between points AB and EF) so that points A and E measure respective tooth surface angles x.(in this example, 40°) on each side of center line 68 on tooth surface 66, and points F and B measure the same tooth surface angles on tooth surface 67.

Each respective tooth surface 66, 67 is then extended by constructing tooth surface extension portions outlined by straight lines 72, 73 and 74, 75, respectively, each of which is drawn tangent to a respective tooth surface angle point A, E, B, F. Each extension line 72, 73 and 74, 75 is respectively extended from its point of tangency toward a projected intersection with the axial center line 76, completing the construction of the tooth surface extension portions. In the final tooth form, the sharp ends of these extension portions are preferably chamfered as indicated in dotted lines.

Since each extension line 72, 73 and 74, 75 is perpendicular to the respective radial line drawn to its point of tangency, it will be noted by simple geometric analysis that the angle formed between each said extension line and axial center line 76 is also equal to x (in this instance, 40°).

Teeth proportioned according to this CT design will slide properly into and out of mesh as our gears interconnect two shafts at variably intersecting angles. Also, this CT design assures that, at one or both of the gear pair's centers of meshing engagement, more than two mating teeth will carry the load even when the axes of the gears are intersecting at the maximum preferred angle.

Further, if the diametral pitch is selected so that each gear has an odd number of teeth, this design assures that more than two mating teeth will carry the load about both of the gear pair's centers of meshing engagement when the gears are intersecting at the maximum preferred angle. This latter condition is illustrated schematically in FIGS. 8A and 8B which represent the outlines of the meshing teeth of a pair of gears according to the invention's CT design, the outlines being shown in modified flat projections, and the pair being shown with their axes intersecting at the preferred maximum angle x.

FIG. 8A represents a first one of the meshing areas of a CT gear pair designed according to the method just described above, while FIG. 8B shows the second meshing area of the same gear pair at the same instant in time. Once again, for purposes of illustration, it is assumed that the gear teeth have been designed for a preferred maximum angle of 40°. As indicated above, this provides an angular range that extends 40° to each side of the position where the axes are either in parallel alignment or are coincident, thereby creating 80° of total articulation.

In FIG. 8A, the center of an external gear tooth 80 is positioned at the center of the first meshing area, and external gear tooth 80 is in contact with internal gear teeth 81, 82. At the same instant of time, at the second shared meshing area shown in FIG. 8B, the center of an internal gear tooth 83 is positioned at the center of the meshing area, and internal gear tooth 83 is in contact with external gear teeth 84, 85. Thus, when the shafts being interconnected by the gear pair are intersecting at the maximum angle, six gear teeth are sharing the load.

FIG. 8C represents the second meshing area shown in FIG. 8B at a moment in time after the gears have each rotated a further distance of three-quarters of the circular pitch. At the time illustrated in FIG. 8C, the radial center line of external gear tooth 86 has come into contact with the right hand extension portion of internal gear tooth 87, and the line of contact between these two teeth begins its sliding movement to the right (as viewed in the drawing) along the front face of tooth 86 and to the left along the rear face of tooth 87. At the same time, the line of contact between internal gear tooth 87 and external gear tooth 85 is sliding to the left along the front face of tooth 87 and to the right along the rear face of tooth 85.

As just indicated above, the number of teeth in mesh when the shafts are oriented at the preferred maximum angle x represents the minimum number of teeth in mesh for all expected operating conditions; and when the shafts move into substantial alignment at 180°, the teeth of the two gears are all fully meshed with each other in a coupling-like manner. Therefore, if the selected diametral pitch and normal chordal thickness of the teeth are sufficient to carry expected loads with the number of teeth in mesh at the preferred maximum angle, the gear pair will have appropriate strength under lesser angular orientations.

Persons skilled in the gearing art will appreciate that the possible scoring of the gear tooth faces must be given special consideration in view of the sliding contact between our gears. However, when considering the possibility of scoring in our gear system, it should be noted that (a) the surface pressure on each tooth is reduced, since the load is shared by multiple teeth at two meshes simultaneously, and (b) the opposite tooth faces of each tooth are under load, respectively, at each of the shared meshes. Also, the tooth surface distance through which each pair of meshing teeth slide relative to each other, as they pass into and out of mesh, is reduced as the shaft angle approaches 180°. Therefore, the sliding velocity decreases as the shaft angle between the gears decreases, and the potential for scoring problems should be minimized if the surface pressure and the sliding velocity between the gear teeth are acceptable at the preferred maximum angle.

(c) Design of CD (Circle-Over-Diamond) Teeth

While there may be other ways to determine the design parameters of gear teeth appropriate for our variable-angle gear system, we have done this by general geometric construction; and the general geometric construction for our CD teeth, illustrated in FIGS. 9A and 9B, is as follows:

(1) In the same manner as was explained above in regard to our CT teeth, the design of our CD teeth also begins by initially determining required size and strength specifications in accordance with the application in which the gearing is to be used and, therefrom, selecting an appropriate addendum size, diametral pitch, and normal chordal thickness for the teeth.

(2) Following the initial selection of such appropriate basic parameters, a portion of the external gear of the pair is laid out in an axial view in the manner shown in the right hand portion of FIG. 9A. Namely, a portion of its pitch circle a and at least two tooth centers b and c are constructed. A radial line d passing through a tooth center b is selected to mark off the center of a "proposed mesh", and an unwound flat projection a' of a portion of the pitch circle a of the external gear is laid out perpendicular to radial line d.

(3) A projected tooth center b' is marked at the intersection of radial line d and unwound pitch circle a' to serve, as indicated above, as the center of the proposed mesh. Then, a second tooth center c, adjacent to tooth center b, is projected from originally constructed pitch circle a to unwound pitch circle a', being identified as projected tooth center c'.

(4) Next, circles e and f are constructed about tooth centers b' and c', respectively, each circle having a diameter equal to the normal chordal tooth thickness determined by the diametral pitch selected in step (1) above. As those skilled in the art will appreciate, this diameter is also equal to one-half of the projected circular pitch of the gear (as indicated by the dotted circle of the same diameter shown midway between projected tooth centers b' and c').

(5) The unwound flat projection of the pitch circle g of the internal gear of the pair is then drawn through the center b' of the proposed mesh at an angle x which is selected to be equal to the maximum desired angle of intersection between the gear axes, and two new tooth centers h and i are marked on unwound pitch circle g, tooth centers h and i being positioned apart at a distance equal to the projected circular pitch and being centered about mesh center b'. New circles k and m, each having the same diameter as tooth circles e and f, are drawn about centers h and i.

(6) Reference is now made to FIG. 9B which is a continuation of the projected mesh construction begun in the left hand portion of FIG. 9A. Unwound pitch circle g also represents the radial center line of each tooth circle k and m, and the angle x (which equals the preferred maximum angle of intersection between the gear axes) is marked off on each side of center line g on each of the opposite faces of tooth circle k, thereby creating two respective tooth face angles (of x°) on each opposite face of tooth circle k. A chord n is then drawn between the outer points o and p of the respective tooth face angles on one side of tooth circle k, and a bisector q is constructed through tooth center h and chord n.

(7) A line is drawn from point o tangent to the surface of tooth circle f at r and ending at its intersection with bisector q at s. A second line is drawn from point s to point p at the other end of chord n, and the equal sides of the resulting isosceles triangle ops form the basic shape of an extension portion that increases the lengthwise width of the gear tooth in an axial direction on one side of tooth circle k. The bisector q is now extended to form the axial center line of the tooth, and a triangle of identical dimensions is then drawn extending from the outer points of the respective tooth face angles on the opposite side of tooth circle k as shown in FIG. 9B, completing an extension portion in the opposite axial direction.

(8) The outline of this apparent "circle-over-diamond" tooth shape, as constructed about tooth center k in the manner just described, is then used for the shape of the teeth (when viewed in a pitch plane of the gear) of both gears in a mating CD pair. Of course, as appreciated by those skilled in the art of gear design and manufacture, while our final CD tooth shape is substantially in this form, minor modifications must be made for tip-relief, clearance, edge and surface smoothing, etc.

A set of such meshing CD teeth are illustrated schematically in FIG. 10 with the gears positioned about a center of mesh 88 and with the axes of the gears oriented at a selected preferred maximum angle of intersection of 40°. At this maximum angle, it can be seen that three internal gear teeth 90, 91, 92 are in contact with two external gear teeth 93, 94. Therefore, like our other tooth designs, more CD teeth are in mesh at all times to carry expected loads than would be true with conventional gear systems.

(d) Possible CT and CD Tooth Design Variation

FIG. 11 schematically represents the meshing teeth of a further pair of gears according to a further shape variation that is applicable to either the invention's CT or CD designs. Once again, the meshing teeth are shown in outline in flat projections as the gears rotate about respective axes variably intersecting at a selected preferred maximum angle, and the flat projections are modified in the same manner as was noted above in regard to FIG. 5B.

In this unusual variation, the respective gears of the mating pair have teeth of different thickness. Once again, the design is by construction and, in the initial design step, a diametral pitch is selected to provide a tooth of minimum size and normal chordal thickness, but still appropriate to carry expected loads. For instance, in FIG. 11 a portion of the CT teeth of an internal gear 100 are laid out in projection as shown; and by way of example, it can be assumed that internal gear 100 has a pitch circle of about 9 cm (3.5") and is initially selected to be a 10-pitch/36-tooth gear with a normal chordal thickness as indicated in the single circle 102 forming the center of one of its CT teeth. The circular pitch for the teeth of internal gear 100 is indicated as cp.

Next, every other tooth is removed from gear 100 as indicated by dotted lines. This leaves a space between each tooth of gear 100 that is equal to three times the diameter of single circle 102, while the remaining internal gear teeth 104, 105, 106 are on centers that are two times the initially selected circular pitch (i.e., 2·cp). Nonetheless, internal gear teeth 104, 105, 106 retain their original dimensions and shape (e.g., as they would appear in a 10-pitch/36-tooth gear).

In the next step of this variation, the teeth of mating external gear 108 are constructed on centers that are also separated by 2·cp. However, when using the CT construction as explained above, the single circle 110 (that is used to form the central portion of each tooth) is provided with a diameter which is equal to three times the diameter of single circle 102 used to form the central portion of the original teeth of internal gear 100.

When the meshing portions of gears 100, 108, constructed in the manner just described above, are laid out in projections as shown in FIG. 11 with the axes of the gears intersecting at a selected preferred maximum angle x (for this example, x=40°), it can be seen that the differently-sized teeth can rotate together in a mating relationship. Further, based upon the gear size parameters suggested as an example above for gears 100, 108 in FIG. 11, each of the two gears become, in effect, a 5-pitch/18 tooth gear, but they retain the same circular pitch and the same shallower whole depth as the original 10-pitch/36-tooth gear would have had.

It can also be seen in FIG. 11 that two of the oversized external gear teeth 111, 112 are in contact with two internal gear teeth 105, 106. Therefore, this variation provides at least four mating teeth for each mesh, i.e., eight teeth in mesh at all times during normal operation.

Our CT, CD, and L/IC gears share another design feature, namely, all require a very slight tip relief for clearance. In FIG. 12, such tip relief is shown, in greatly exaggerated form, in a schematic perspective: a tooth face of an external gear CD tooth 114 has the upper addendum of each of its respective extension portions 116, 117 chamfered slightly, the depth of the chamfer increasing from zero, at the radial center line of the tooth, to a maximum at the outside edge of the tooth face as it meets the axial center line of the tooth. To provide some appreciation for the amount of relief required: the teeth of an external CD gear with an outside diameter of 10 cm (4") would require approximately 0.2 mm (0.008") maximum tip relief at their outer edges.

Such slight tip relief can be simply generated during the manufacture of our gearing. For instance, in a process in which the gears are initially forged to a "rough-but-near-finished" shape, the forged rough gears can be finished by CBN grinding with a finishing tool having the form of a mating gear without any tip relief.

(e) Lune Tooth Design

Our gear system includes still another gear tooth design that is easily manufactured and has particular utility in some applications. We call this design "lune" because the the outline of the entire lengthwise surface of each of the opposite working faces of each tooth is formed by the arc of a single circle, and when viewed on the pitch surface of the gear, the outline of the two working faces of each tooth create a lune-like shape. (Geometrically, a "lune" is the area bounded by two intersecting great circles on the surface of a sphere.) For this explanation of our lune design, reference will be made to FIGS. 13A and 13B.

FIG. 13A shows the geometric construction used to determine the circular arc that forms the lengthwise curvature of each tooth face. First, in the same manner as was explained above in regard to our CT and CD teeth, the design of our lune teeth also begins by initially determining required size and strength specifications in accordance with the application in which the gearing is to be used and, therefrom, selecting an appropriate addendum size, diametral pitch, and normal chordal thickness for the teeth. With this information, a simple construction is made of a radial cross section of the external gear 115, laying out the addendum circle 116, the root circle 118, and the pitch circle 120; and the outlines of a few teeth are also added.

Next, the preselected preferred maximum angle x (in this example: 25°) is laid out from the gear center 122 between radial lines 124, 125; and a chord 126 is drawn between the two respective points 127, 128 at which radial lines 124, 125 intersect pitch circle 120. The length of chord 126 is measured to provide the diameter measurement X which is used for creating the single circle that determines the arc that forms the entire length of the working surface of each lune tooth for the gears.

In a further construction shown in FIG. 13B, external gear 115 and a mating internal gear 130 are laid out in modified flat projections (as explained above) with the axes of the gears intersecting at the preselected preferred maximum angle (i.e., 25°), the pivot axis about which the gear axes intersect being indicated by the center 132 of the shared mesh. A circle having a diameter of X is drawn about center 132, and the arcs of this circle form the front face of external gear tooth 134 and the rear face of external gear tooth 135. Center 132 is also used to mark the center of an external tooth, and further external tooth centers 137, 138 are marked off along radial center line 136 of gear 115 at successive distances equal to the preselected circular pitch. Thereafter, using circles of the same diameter X and using the successive centers 137, 138, etc., the front and rear faces of the other external gear teeth are constructed.

Similarly, beginning at two points marked off at a distance of one-half the circular pitch on each side of mesh center 132, successive tooth centers 139, 140 are marked off along radial center line 141 of internal gear 130. Then, using circles of the same diameter X and using the successive centers 139, 140, etc., the front and rear faces of the gear teeth of internal gear 130 are constructed. As will be readily understood by persons skilled in the manufacture of gears, such lune gear teeth can be formed by using hollow cylindrical cutters with an inside diameter of X.

With this construction as shown, it can be seen that many lune teeth (e.g., approximately 10 teeth at each shared meshing area) will be in full contact on both of their respective faces when the shaft angle between the gears is at the maximum angle. However, the normal chordal thickness of each lune tooth is not as large as the space between the teeth of its mating gear so that, as the shaft angle decreases from this maximum orientation back toward 180° alignment, the backlash between the meshing lune teeth increases, reaching a fairly substantial maximum amount of backlash when the axles reach 180° alignment. Therefore, our lune-tooth design is not appropriate for applications in which minimum backlash is required at all times, e.g., where expected shaft rotation reversals occur with relative frequency during normal operation.

(f) Combination Lune/Inverse Curve ("L/IC") Design

FIGS. 14A and 14B are schematic representations of the outlines of the meshing teeth of still another pair of gears according to the invention. For reasons that will be apparent from the following explanation, we call this design a lune/inverse-curve combination ("L/IC"). Once again, the outlines of the teeth are shown in modified flat projections of the pair with their axes intersecting at a preferred maximum angle. Of course, it must be remembered that such flat projection merely simulates the real gears whose pitch surfaces are spherical. That is, should the gears illustrated in FIG. 14A be erroneously laid out in the traditional manner on pitch "cylinders", serious interference would occur. However, when laid out on a pitch sphere (or on respective ones of a pair of respective pitch spheres having substantially equivalent radii and coincident centers), these teeth will mesh throughout the full range of angular adjustment without interference or excessive backlash.

As with our other tooth designs just described above, the teeth shown in FIGS. 14A and 14B are most easily explained by means of a construction. For these L/IC teeth, a construction of the design begins with the usual initial determination for selecting an appropriate addendum size, diametral pitch, and normal chordal thickness for the teeth, as well as the desired maximum angle x through which the gear shafts shall be expected to variably intersect to each side of 180°.

Based upon these preselected parameters, flat projections of the pitch circles of the two gears are laid out intersecting at the maximum angle (in this case at an angle of 45°); and, as with the CT and CD designs, a tooth center 80' for one of the gears is positioned at the point of intersection between the pitch circles. Using the selected circular pitch P', additional tooth centers 81', 82', and 83', 84', 85' and 86', respectively, are marked on each pitch circle. Next, the central portion of each tooth is laid out as a respective circle having a diameter equivalent to the desired chordal thickness D'. Namely, each respective circle is made with a radius T that is equivalent to one-half the chordal thickness (i,e., one-quarter the circular pitch).

The teeth of a first one of the gears are then formed with a lune design, the entire length of each tooth face 87', 88', 89', 90' of each tooth being the arc of a circle having its center located on the pitch circle of the first gear and having a radius R' such that:

$$R' = 3T = \frac{3D'}{2} = \frac{3P'}{4}$$

radius R' being equivalent to one and one-half times the selected chordal thickness, which is also equivalent to three-quarters of the circular pitch.

The teeth of the mating gear of the second gear are formed about tooth centers 80', 81', 82' in a manner quite similar to that described above with regard to our CT and CD teeth. Namely, each circular-arc center portion 91', 92' of each tooth surface is provided with two axially-extending portions 93', 94' contiguous, respectively, with each of its ends; and the surface of each respective extension portion 93', 94' is a line (a) extending from circular central portion 91', 92' at a respective one of two points A', E' and B', F' oppositely disposed from the radial center line 95' of the tooth at respective predetermined tooth surface angles x and (b) extending toward a projected intersection with the axial center line 96' of the tooth. Also, in our L/IC design, like our CT design, the surface of each respective tooth surface extension portion is tangent to the circular central portion of each tooth face.

However, as can be seen in FIG. 14A, each respective tooth surface extension portion 93', 94' is a curved line having a curvature inverse to the curvature of circular central portion 91'. Each of these inversely-curved extension portions is a circular arc with a center of curvature positioned on an extension of its respective tooth surface angle line A', B' and E', F'. Such a construction is shown for the tooth surface extension portions of tooth 97', for which the centers of curvature for extension portions 100', 101', 102' and 103' are, respectively, points 104', 105', 106' and 107'. In this construction, the radius R' of each extension portion is equivalent to three times the radius T of its respective circular central portion.

FIG. 14B illustrates the same mesh of the same pair of L/IC gears shown in FIG. 14A, but with their axes intersecting at only 20° rather than at the preferred maximum angle. It can be seen that five teeth are still in mesh. Therefore, our L/IC design also provides more teeth in mesh at all times than does a conventional gear system; and, further, when the axes are aligned at 180°, all the teeth are in mesh as in a gear coupling.

Constant-Velocity Joints

While our gear system can be used in any application that requires the transfer of rotational forces between elements whose axes intersect at variable angles during normal operation, one of its primary applications is in automotive technology relating to universal and constant-velocity ("CV") joints.

In FIG. 15, a first embodiment of a CV joint according to our invention is shown in a schematic and partially cross-sectional view. One of our external gears 150 is mounted to a hub 152 splined to the end of a drive shaft 154, and its mating internal gear 156 is mounted to a cup-like support 158 fixed to the end of a driven shaft 160. Gears 150 and 156 are maintained in a meshing relationship by means of a spherical bearing comprising a large ball bearing 162 fixed to the center of support 158 at the end of driven shaft 160 by a bolt 163. Ball bearing 162 is held in a cage 164 that is trapped between an outer lip 166 of hub 152 and a spring ring 168 located by an appropriate channel in hub 152.

For assembly purposes, the splined end of hub 152 is bored out all the way to the inside diameter of the splines, and cage 164 is divided into two parts. During assembly: (a) the outer half of cage 164 is placed against lip 166, (b) ball 162 is placed in the outer half of cage 164, (c) the inner half of cage 164 is positioned around ball 162, (d) spring ring 168 is positioned in hub 152 to retain cage 164, and (e) bolt 163 is used to secure ball 162 to shaft 160.

With this bearing structure, the centers of both gears are maintained at all times coincident with the center of ball 162, while ball 162 is free to move in any direction relative to its cage 164; and gears 150, 156 remain in mating contact about two meshing centers as shafts 154, 160 intersect variably throughout a wide range of shaft angles in any plane.

FIG. 16 is a schematic and partially cross-sectional view of another embodiment of a constant-velocity joint according to the invention. While this further embodiment is similar to the CV joint of FIG. 15, it includes a special spherical bearing that is preferred for use under high speed and high torque conditions.

Internal gear 170 is fixed to cup-like support 172 and driven shaft 173, while external gear 175 is fixed to a hub structure 176 splined to drive shaft 177, and the central portion of the spherical bearing once again comprises a large ball 178 secured to support 172 and shaft 173 by a bolt 179. Also, ball 178 rides in a cage 180 that is retained in an appropriate channel formed in hub structure 176. However, in this heavy-duty embodiment, ball 178 does not ride directly on cage 180 but rather is supported by many smaller balls 182 that are trapped in cage 180 by a series of races formed by very thin ring washers 183 which are latitudinally positioned about ball 178. For assembly purposes, cage 182 is again split into two parts secured by bolts 184 (only one shown). With this ball-bearing arrangement, separate groups of smaller balls 182 are each retained, respectively, in separate latitudinal raceways, but the balls remain free to roll longitudinally.

In the manner explained above, the teeth of our gears used in these CV joints are designed for some predetermined maximum preferred shaft angle. In FIG. 16, the CV joint is shown articulated in the plane of the paper about pivot axis 186 to its preferred maximum angle (in this example: 40°); and, to illustrate the range of articulation of this CV joint, the lower end of gear 175 is also shown in phantom lines, indicating the position of gear 175 when it is pivoted to the same maximum angle in the opposite direction.

Lubrication of the spherical bearings of these CV joints is facilitated by suitable channels bored through, and around the surface of, the large balls (such channels are only shown in FIG. 15). Also in this regard, those skilled in the art will appreciate that during shaft angle changes, e.g., caused by the rise and fall of a knee-action supported drive wheel, the hubs (e.g., hub 152 and hub structure 176) must move slightly axially relative to the ends of their respective shafts. Under these circumstances, lubricating fluid trapped between the end of shaft 177 and ball 178 is pumped through and around the spherical bearing.

It should be noted that the ball-mounted CV joints just described above are capable of articulation in any plane passing through the center of the ball. Of course, should the required articulation of the shaft angles be limited to only one plane (e.g., only left and right, or only up and down), then the CV joint may be simplified, e.g., to a structure similar to the embodiment shown in FIG. 1.

In many trucks, the rear wheels are driven through a differential that is located nearer the ground than is the output of the truck's transmission, and a drive shaft incorporating our gear system can be used to provide the required articulated connection between the transmission and the differential of such trucks. FIG. 17 is a schematic representation of such a drive shaft 188 with a respective pair of our gears 189, 190 located at each end. The internal gear 192 of gear pair 189 is held in a cup-like support 193 which includes a base plate 194 adapted for connection to the output of the transmission. The external gear 195 of gear pair 189 is fixed to the left-hand end of shaft 188. Similarly, the external gear 196 of gear pair 190 is fixed to the right-hand end of shaft 188, while its mating internal gear 197 is held in cup-like support 198 that is fixed to a shaft 199 which can be appropriately connected to the truck's differential.

Gear pairs 189, 190 on articulated shaft 188 are schematically represented as having respective ball bearings for positioning the gears relative to each other. Therefore, the arrangement shown in FIG. 17 is appropriate for any application in which either or both plate 194 and shaft 199 may require articulation in more than one plane. However, when this articulated shaft assembly is used in a truck in the manner just described, the angular orientation of each gear set is usually fixed in one plane at some preselected angle and, as just indicated above, simpler gear-mounting arrangements (similar to the embodiment shown in FIG. 1) can be used for supporting the gears.

It should be noted that the total articulation provided by the gear arrangement of FIG. 17 includes the maximum preferred angle of gear pair 189 plus the maximum preferred angle of gear pair 190. Therefore, modifications of this arrangement can be used to provide a remarkably articulated joint. For instance, if the length of shaft 188 is minimized (e.g., if the two shaft ends were effectively positioned back-to-back), and if gear pairs 189, 190 were each designed to transmit constant-velocity rotational forces under all expected loads while the shaft angles of their respective gears are varied through 30° in any plane, then: the just-described back-to-back arrangement would provide constant-velocity articulation up to an angle of 60° in any one plane, while providing up to 30° articulation in one plane concurrently with another 30° articulation in any other plane.

FIG. 18 shows, schematically, a further example of an application of our invention as a constant-velocity joint 200 (similar to that shown in FIG. 15) incorporated in a steered drive for a vehicle. One end of a steer-drive axle 201 is splined to a conventional driving flange 202 to which the front wheel of a vehicle is fixed by bolts (neither the wheel nor the bolts are shown). The other end of steer-drive axle 201 is fixed to a cup 204 that supports an internal gear 206 of the gear pair comprising CV-joint 200.

The external gear 207 is fixed to the end of a drive shaft 208 which, in turn, rotates in journals (not shown) held in the automotive frame member 210. Steer-drive axle 201 is suitably supported by bearings (not shown) in a wheel support 212 rotatably connected to frame member 210 by kingpins 214. The large ball bearing 216 permits the shaft angle between gears 206, 207 to vary as wheel support 212 is steered.

Further, in other well-known conventional arrangements, e.g., in which frame member 210 is replaced by knee-action structures for up-and-down movement, ball bearing 216 permits concurrent articulation in this second plane. During such instances of concurrent articulation in multiple planes, the gear pair 206, 207 of CV-joint 200 continues at all times to share two meshing areas centered 180° apart, and the gears move with a relative nutating motion as they rotate together at a 1:1 ratio.

Attention is called to another feature of the steer-drive arrangement illustrated in FIG. 17; namely, it overcomes the torque-steer problems that occur in steer-drive axles with prior art CV-joints. "Torque-steer" is the term used in the art to describe the tendency of a rotating joint to create an undesirable turning moment about the kingpins of a steered axle. This problem is avoided in the axle design shown in FIG. 18 by the alignment of kingpins 214 with the pivot axis of CV-joint 200. Since gears 206, 207 share two mesh points positioned 180° apart, and since these mesh points are aligned with the pivot axis between the driving and driven shafts, the rotation of the gears at their 1:1 ratio creates no moment about the pivot axis; and since the pivot axis of CV-joint 200 is aligned coincident with the axis of kingpins 214, the rotation of the gears creates no unwanted steering moments about the kingpin axis and does not result in torque-steer.

One of the important features of our constant-velocity joint relates to its ease of lubrication. FIG. 19 is a schematic and partially cross-sectional representation of a rotating constant-velocity joint similar to that shown in FIG. 15. The joint is represented during operation as an articulated connection between two elements of an open automotive drive shaft. At the moment illustrated, it is assumed that the shaft elements are articulated at an angle of about 15° and that they are rotating at more than 300 rpm.

An external gear 150' is mounted to a hub 152' having a circumferential extension portion 153' splined to the end of an open drive shaft element 154'. The coupling's mating internal gear 156' is mounted to a cup-like support 158' that includes a circumferential lip portion 159' and is fixed to the end of an open drive shaft element 160'. Attached between circumferential extension portion 153' of hub 152' and circumferential lip portion 159' of cup-like support 158' is an elastomeric boot 161'. The respective ends of boot 161' are sealed against extension portion 153' by a sheet metal strap 165' and against lip portion 159' by a sheet metal collar 167'. Cup-like support 158' and elastomeric boot 161' combine to enclose the joint mechanism within an encapsulating cover.

As rotational motion is transmitted from shaft element 154' to shaft element 160', a lubricating fluid 169' within the encapsulated joint is pressed by centrifugal forces to the sides of cup-like support 158' and into the meshing teeth of the mating gears. Since our entire joint mechanism rotates with the axle shaft elements, the spinning metallic sides of cup-shaped support 158' are air cooled and conduct away heat generated in lubricating fluid 169'. Further, the vertical portions of sheet metal collar 167' provide elastomeric boot 161' with support for restraining the axial flow of lubricating fluid and for withstanding the pressures of this centrifuge effect.

As explained above (with reference to FIGS. 3A, 3B, and 3C), while angularly-intersecting external gear 150' and internal gear 156' rotate at a 1:1 ratio, their mating teeth continuously slide into and out of mesh at their two shared meshing areas positioned 180° apart. That is, as the joint shown in FIG. 19 rotates through one-quarter of a revolution, teeth 150a, 150b of external gear 150' slide across the respective faces of mating teeth 156a, 156b of internal gear 156' and into full mesh, carrying lubrication fluid pressed against them when in the position illustrated. After another one-quarter revolution, these gears move out of mesh and the spaces between the teeth of the gears are again filled with lubricating fluid pressurized by the centrifuge action of the rotating coupling. Also during operation, this sliding motion of the gear teeth creates a constant mist of lubrication fluid that saturates the atmosphere within the encapsulated joint for lubricating the ball bearing mechanism.

Systems with Higher Gear Ratios

Our gear system can also be used to transmit rotational forces at ratios greater than 1:1. However, in such arrangements, the gears no longer share two meshing areas. Instead, the gears share only one meshing area in the same manner as conventional gearing, but they still transfer rotational forces while their respective shafts are varied relative to each other throughout a predetermined range of angles as explained above.

FIGS. 20A and 20B are schematic representations of two views of a gear system for transmitting rotational forces at ratios other than 1:1 (e.g., 2:1). FIG. 20A shows a top view of an internal gear 220 held by a cup-like support 222 that is fixed to the end of a shaft 224. A mating external gear 226 is formed at the end of a shaft 228 which, in this representation, has been adjusted upward in the plane of the drawing at a maximum preferred angle x above its 180° alignment position relative to shaft 224. Gear 226 is also shown in phantom lines after shaft 228 has been adjusted downward at the same maximum preferred angle x below its 180° alignment position relative to shaft 224. As explained in detail above, the mating teeth of gears 220, 226 remain in mesh as the shaft angle changes throughout this entire range of motion.

Since gears 220, 226 have differently-sized pitch circles, they do not rotate at the same speed relative to each other. Therefore, while their respective tooth faces slide past each other in the manner explained above in regard to 1:1 ratio gear arrangements, the teeth of the smaller gear 226 must also engage in rolling contact with the teeth of the larger gear 220. To accommodate this rolling engagement in arrangements designed for ratios other than 1:1, the gear teeth are provided with involute profiles. As indicated above, the CT and CD tooth designs are preferably formed with straight-sided tooth profiles, and involute profiles cannot be readily added to either of these designs. Thus, for ratios other than 1:1, the above-described lune design is preferred for the gear teeth.

As indicated earlier, lune teeth are only in tight mesh when the gear shafts are positioned at the preferred maximum angle; and backlash between the mating teeth increases steadily as the shaft angle decreases, reaching maximum backlash when the shaft angle is 180°. FIG. 20B is an end view of the arrangement illustrated in FIG. 20A, omitting all elements except gears 220, 226 and showing (with exaggerated spacing) the maximum backlash that occurs when the gears are positioned with their respective shafts aligned at 180°.

In FIG. 21, still another arrangement of our gear system is schematically represented using only external gearing. While both gears 220', 226' have external teeth, this arrangement functions in a manner similar to that just discussed above. Namely, the gears transmit rotational forces at ratios other than 1:1 (e.g., 2:1), and the mating teeth of the gears remain in mesh at all times as the shaft angle between the gears changes throughout the entire range of motion determined by a preselected maximum angle. Further, since gears 220', 226' have differently-sized pitch circles, they do not rotate at the same speed relative to each other and, therefore, engage in rolling contact with each other. Again, to accommodate this rolling engagement in arrangements designed for ratios other than 1:1, the gear teeth are provided with involute profiles, and the lune design is preferred.

Also the lune teeth of gears 220', 226' are only in tight mesh when the gear shafts are positioned at the preferred maximum angle, the backlash between the mating teeth increasing steadily to the maximum which is reached when the shaft angle between the gears is 180°, i.e., in the relationship shown in FIG. 21. Of course, this backlash does not create a problem for those applications in which the gears are used to transfer forces primarily in one direction of rotation, and our gear system can be used to transmit such rotational forces while the shafts of the gears are adjusted through a wide range of angles less than 180°.

We claim:

1. A method for proportioning the shape of the teeth of a pair of mating gears designed to transmit rotational forces between two elements which are each rotatable about a respective one of two axes that variably intersect with each other when in one of (a) the same plane and (b) parallel planes projected one upon the other, said method comprising the steps of:

constructing a respective pitch surface and a respective pitch circle for each of said mating gears, each said pitch surface being in the form of a respective pitch sphere, and said two pitch spheres and two pitch circles being constructed in one of the positions:
  (a) wherein said two pitch spheres are concentric and have radii which are substantially identical, and each said pitch circle is, respectively, a great circle on a respective one of said substantially identical spheres so that said pitch circles effectively intersect with each other at two points and said gears share two meshing points separated by 180° when rotating relative to each other at a 1:1 ratio, and
  (b) wherein said two pitch spheres are not concentric and are tangent at only one point, and where each said pitch circle is a great circle on a respective one of said tangent spheres so that said pitch circles intersect with each other at only one point and said gears share only a single meshing point when rotating relative to each other;
determining the desired diameter of the pitch sphere of one of said gears whose pitch circle is the great circle on one of (a) said concentric pitch spheres and (b) the larger one of said two tangent pitch spheres;
calculating the diametral pitch necessary to provide each tooth with a normal chordal thickness sufficient to support the rotational forces expected to be transferred between said two rotatable elements; and
forming the central portion of each lengthwise tooth surface of each mating tooth of at least one of said mating gears, when viewed on the respective pitch sphere of said one gear, as an arc of a first single circle with a diameter selected so that, when said gears are rotating in a driving and driven relationship, said intersecting axes can be varied over a continuous range of angles extending from 180° to a predetermined maximum angle differing from 180°.

2. The gear-proportioning method of claim 1 comprising the further step of:
using arcs of said first single circle to form at least a central portion of all said lengthwise tooth surfaces of both gears.

3. The gear-proportioning method of claim 1 comprising the further step of:
using arcs of said first single circle to form at least a central portion of all lengthwise tooth surfaces of at least a first one of said gears, said first single circle having a diameter equal to said normal chordal thickness.

4. The gear-proportioning method of claim 3 comprising the further steps of:
providing each said lengthwise tooth surface of at least said first one of said gears with two enlargement portions formed respectively on one respective end of each said circular-arc central portion, each said enlargement portion extending the face width of each said tooth surface from said circular central portion in a respective axial direction of said first gear; and
forming each said respective enlargement portion so that, when viewed on said spherical pitch surface, said enlargement portion is a line that:
  (a) extends from said circular central portion at a respective one of two points oppositely disposed at a respective predetermined tooth surface angle to a radial center line of said circular central portion, and
  (b) intersects with an axial center line of the tooth on a respective opposite side of said circular central portion.

5. The gear-proportioning method of claim 4 comprising the further step of:
assigning to each said tooth surface angle a value equal to said predetermined maximum angle at which said two axes variably intersect with each other.

6. The gear-proportioning method of claim 5 comprising the further step of forming each said line as a straight line extending tangent to said circular central portion.

7. The gear-proportioning method of claim 6 comprising the further step of:
extending said line from said circular central portion at a respective one of said two oppositely disposed points so that said line:
  (a) is tangent to said circular central portion at a respective one of said oppositely disposed points; and
  (b) intersects with said axial center line of the tooth, on a respective opposite side of said circular central portion, at an angle equal to said respective predetermined tooth surface angle.

8. The gear-proportioning method of claim 5 comprising the further step of:
extending said line from said circular central portion at a respective one of said two oppositely disposed points so that said line:
  (a) is tangent to said circular central portion at a respective one of said two oppositely disposed points;
  (b) intersects with said axial center line of the tooth on one respective opposite side of said circular central portion; and
  (c) is a curved line with a curvature inverse to the curvature of said circular central portion.

9. The gear-proportioning method of claim 8 comprising the further step of forming said inverse curvature as the arc of a second circle having a radius equivalent to one and one-half times said normal chordal thickness.

10. The gear-proportioning method of claim 9 comprising the further step of forming each lengthwise tooth, surface of each said mating tooth of the second gear of said pair so that, when viewed on said spherical pitch surface of said second gear, each said lengthwise tooth surface is an arc of said second circle.

11. The gear-proportioning method of claim 5 comprising the further step of:
forming said line extending from a respective one of said two oppositely disposed points of said teeth of said first gear as a straight line so that
  (a) when said mating gears are in mesh and said axes of said elements are intersecting at said preferred maximum angle,
  (b) said line is tangent to, and extends beyond the radial center line of, the circular central portion of the meshing mating tooth of the second gear of said pair.

12. The gear-proportioning method of claim 1 when both of said mating gears have pitch circles that are great circles on said concentric pitch spheres, comprising the further step of:
using a circle of a first diameter for the central portion of all tooth surfaces of a first one of said mating gears and a circle of a second diameter for the central portion of all tooth surfaces of the second of said mating gears.

13. The gear-proportioning method of claim 12 comprising the further steps of:
determining the circular pitch of both mating gears based upon said calculated diametral pitch;

selecting for said first diameter a measurement equal to one-half said determined circular pitch;

forming the teeth on said first gear in accordance with said calculated diametral pitch but omitting every other tooth so that, in effect, the base circular thickness and depth of each tooth of said first gear is properly sized in accordance with said diametral pitch but the tooth space between each said tooth of said first gear is equal to three times the base circular thickness of each said tooth of said first gear; and forming the teeth on said second gear with a depth in accordance with said calculated diametral pitch but omitting every other tooth and selecting for said second diameter a measurement equal to three times said first diameter so that the base circular thickness of each tooth of said mating gear is substantially equal to the tooth space between each said tooth of said first gear and, when said gears are in a mating relationship and said axes are in 180° alignment, the teeth of said gears cooperate as in a toothed coupling.

14. The gear-proportioning method of claim 1 comprising the further step of:

using an arc of said first single circle to proportion the entire length of each tooth surface of each respective gear.

15. The gear-proportioning method of claim 4 comprising the further step of:

forming said first single circle identical in size to a circle formed on the surface of one of (a) said concentric pitch spheres and (b) the larger of said differently-sized spheres and having a diameter that subtends an angle, measured from the center of said one sphere, equal to said maximum preferred angle.

16. The gear-proportioning method of claim 1 comprising the further steps of:

constructing the central portions of both lengthwise tooth surfaces of each mating tooth of a first gear of said pair so that, when viewed on the respective pitch sphere of said first gear, said tooth surfaces are formed as circular arcs on the opposite sides of said first single circle;

providing each circular-arc central portion of each said tooth surface of said first gear with two axially-extending portions contiguous, respectively, with each end of said circular-arc central portion;

designing the surface of each respective extension portion, when viewed on said pitch sphere, as a curved line (a) having a curvature inverse to the curvature of said circular central portion, (b) extending from, and tangent to, said circular central portion at a respective one of two points oppositely disposed at respective predetermined tooth surface angles measured from a radial center line of said tooth surface, and (c) extending toward a projected intersection with the axial center line of the tooth; and using an arc of a second single circle to proportion the entire length of each tooth surface of the second gear of said pair.

17. The gear-proportioning method of claim 16 wherein:

said first single circle has a diameter equal to said normal chordal thickness;

said second single circle has a radius equivalent to one and one-half times said normal chordal thickness; and said inverse curvature of the tooth surface of said first gear is the arc of a circle having a radius equivalent to one and one-half times said normal chordal thickness.

18. The gear-proportioning method of claim 16 comprising the further steps of:

constructing said tooth surfaces of said first gear so that said tooth surface angles are each equal to said predetermined maximum angle;

constructing said maximum predetermined maximum angle to be 45°; and selecting said diametral pitch so that, when said axes are positioned at said predetermined maximum angle, more than two of said mating teeth of each gear will be in mesh simultaneously at each meshing area shared by said mating gears.

\* \* \* \* \*